(12) United States Patent
Baer et al.

(10) Patent No.: US 8,702,384 B2
(45) Date of Patent: Apr. 22, 2014

(54) AIRFOIL CORE SHAPE FOR A TURBOMACHINE COMPONENT

(75) Inventors: Julianne Edna Baer, Simpsonville, SC (US); Umesh Garg, Karnataka (IN)

(73) Assignee: General Electric Company, Schenectady, NY (US)

( * ) Notice: Subject to any disclaimer, the term of this patent is extended or adjusted under 35 U.S.C. 154(b) by 688 days.

(21) Appl. No.: 13/038,099

(22) Filed: Mar. 1, 2011

(65) Prior Publication Data

US 2012/0224954 A1    Sep. 6, 2012

(51) Int. Cl.
*F01D 1/02* (2006.01)
*F01D 5/14* (2006.01)
*F01D 9/04* (2006.01)

(52) U.S. Cl.
CPC ............. *F01D 5/141* (2013.01); *F01D 9/041* (2013.01); *F05D 2240/12* (2013.01); *F05D 2250/74* (2013.01); *Y10S 416/02* (2013.01)
USPC .................. 415/191; 416/223 A; 416/DIG. 2

(58) Field of Classification Search
USPC .............. 415/191; 416/223 A, 223 B, 223 R, 416/229 R, 243, DIG. 2
See application file for complete search history.

(56) References Cited

U.S. PATENT DOCUMENTS 7,572,104 B2    8/2009  Hudson et al.
2008/0273970 A1*  11/2008  Sleiman et al. ............ 415/208.1

* cited by examiner

*Primary Examiner* — Edward Look
*Assistant Examiner* — Jason Davis
(74) *Attorney, Agent, or Firm* — Cantor Colburn LLP

(57) ABSTRACT

A turbomachine component includes a compressor stator vane having an airfoil core shape. The airfoil core shape includes a nominal profile substantially in accordance with Cartesian coordinate values of X, Y, and Z set forth in TABLE 1, and wherein X and Y are distances in inches which, when connected by smooth continuing arcs, define airfoil profile sections at each distance Z in inches. The profile sections at the Z distances are joined smoothly with one another to form a complete airfoil core shape.

8 Claims, 5 Drawing Sheets

AIRFOIL CORE SHAPE FOR A TURBOMACHINE COMPONENT

BACKGROUND OF THE INVENTION

The subject matter disclosed herein relates to the art of turbomachines and, more particularly, to an airfoil shape of a turbomachine component.

Many system requirements must be met for each stage of a gas turbine in order to meet design goals including an overall improvement in compressor efficiency. In particular, first stage compressor stator vanes must meet system requirements including airfoil loading and manufacturability. These first stage compressor stator vanes must operate within a particular set of boundary conditions based on operating conditions of the gas turbine while maintaining a shape that meets design specifications.

BRIEF DESCRIPTION OF THE INVENTION

According to one aspect of the exemplary embodiment, a turbomachine component includes a compressor stator vane having an airfoil core shape. The airfoil core shape includes a nominal profile substantially in accordance with Cartesian coordinate values of X, Y, and Z set forth in TABLE 1, and wherein X and Y are distances in inches which, when connected by smooth continuing arcs, define airfoil profile sections at each distance Z in inches. The profile sections at the Z distances are joined smoothly with one another to form a complete airfoil core shape.

According to another aspect of the exemplary embodiment, a turbomachine includes a compressor portion, and at least one compressor vane provided in the compressor portion. The compressor stator vane includes an airfoil core shape. The airfoil core shape includes a nominal profile substantially in accordance with Cartesian coordinate values of X, Y, and Z set forth in TABLE 1, and wherein X and Y are distances in inches which, when connected by smooth continuing arcs, define airfoil profile sections at each distance Z in inches. The profile sections at the Z distances are joined smoothly with one another to form a complete airfoil core shape.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
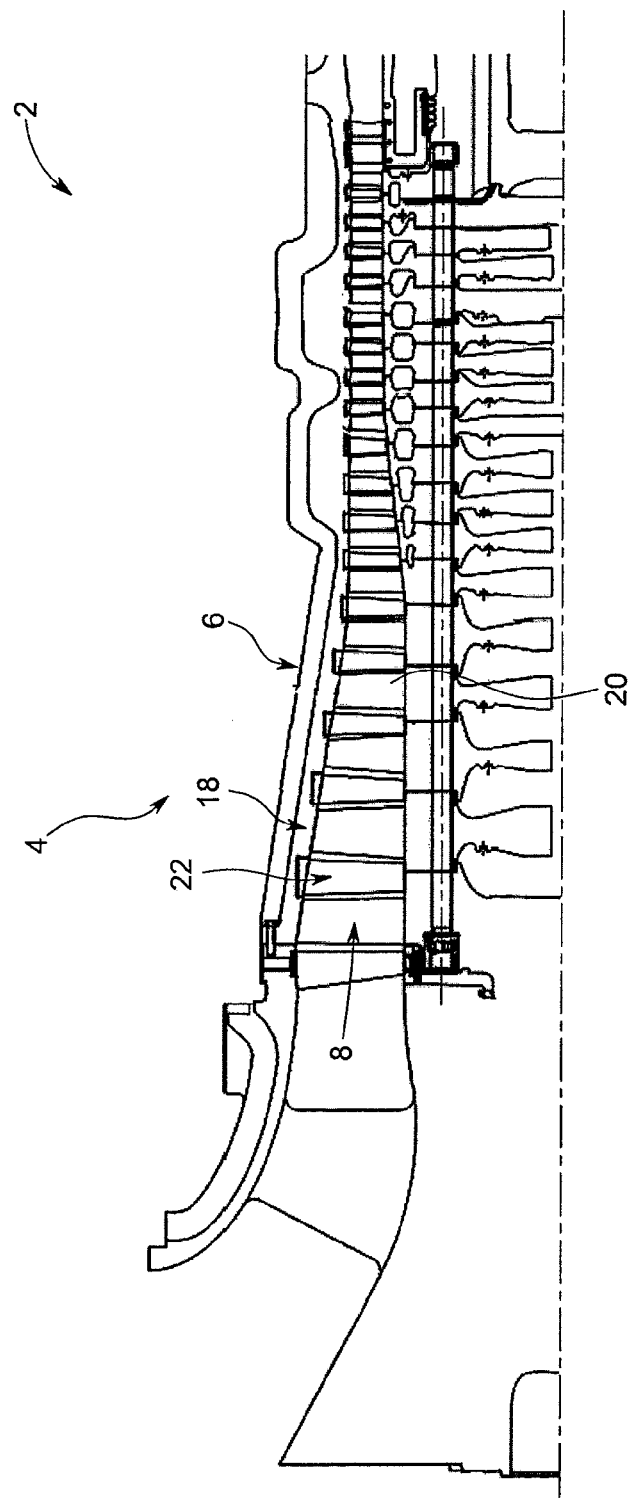
FIG. 1 is a cross sectional view of a compressor portion of a turbomachine including a first stage compressor stator vane having an airfoil shape constructed in accordance with an exemplary embodiment of the invention.

The detailed description explains embodiments of the invention, together with advantages and features, by way of example with reference to the drawings.

DETAILED DESCRIPTION OF THE INVENTION

As shown in FIGS. 1-4, a turbomachine 2 constructed in accordance with an exemplary embodiment includes a compressor portion 4 and a turbine portion (not shown). Compressor portion 4 is enclosed by a compressor housing 6 and has an axial flow path 8. Compressor portion 4 includes a plurality of variable and stationary vanes, and moving rotor blades two of which are shown at 18 and 20 respectively. Compressor portion 4 is also shown to include additional compressor stages (not separately labeled) the number of which can vary depending upon compressor make and model. Among the stationary vanes 18 is stator "0" or a first stage compressor stator vane 22 for 7F, 7FA, 7FA+, 7FA+e gas turbine frames.

In the exemplary embodiment shown, first stage compressor stator vane 22 includes an airfoil core shape 30 having first and second ends 34 and 36. First end 34 is provided with a base member 38 that serves as an anchor point. More specifically, base member 38 is a dovetail portion that interfaces with a second dovetail slot (not shown) to locate it in the compressor flow path. Airfoil core shape 30 has a profile including a three dimensional (3-D) shape that defines a suction side 44 and a pressure side 46 as well as a leading edge 49 and a trailing edge 48.

An important aspect of first stage compressor stator vane 22 is airfoil core shape 30, which in accordance with an exemplary embodiment is configured for enhanced turbine performance. A list of X, Y, and Z coordinates or points for airfoil core shape 30 is presented in TABLE I, and meets compressor requirements for interaction between adjacent stages, aerodynamic efficiency and provides an improved aeromechanics margin over prior shapes. Moreover, the particular airfoil core shape 30 in accordance with the exemplary embodiment meets system requirements for flow dynamics, loading, and frequency response. The points are arrived at by iteration between aerodynamic and mechanical design improvements and are the only loci of points that allow turbomachine 2 to operate in an efficient, smooth manner. As will become more fully evident below, airfoil core shape 30 is represented as a set of 3024 points listed in TABLE 1. The 3024 points represent 27 airfoil sections each containing 112 points, of which 24 sections comprise airfoil core shape 30. The X, Y, and Z coordinates, which represent a profile of airfoil core shape 30, are created in a coordinate system which is defined relative to a cold engine part. The origin of the coordinate system on the cold centerline axis is X=0.0, Y=0.0 and Z=0.0. The Z coordinate axis is defined as a radial line from the Y coordinate axis; the X coordinate axis is defined as being normal to a plane defined by the Y-Z axis. The airfoil sections are cut normal to the Z coordinate axis. X and Y points, which make up the airfoil core profile shape at each section, are in inches. The radial Z values in inches for the section planes have an origin of $Z_0$.

The radial distance between each section varies however a total radial distance of airfoil core shape 30 is 15.4294 inches. The bottom and top sections $Z_0$ and $Z_1$, may be obscured by cast-in features, such as base member 38, that are not included in the X, Y, and Z points that define airfoil core shape 30. All of the 3024 points are taken from a nominal cold or room temperature for each airfoil section of airfoil core shape 30.

Each airfoil section is joined smoothly with adjacent airfoil sections to form the airfoil core shape 30.

It should be appreciated that as each compressor stator vane 22 heats up during operation of compressor portion 4, the airfoil core profile shape will change as a result of stress and temperature. Thus, the X, Y and Z points are provided at cold or room temperature for manufacturing purposes. Since the manufactured airfoil core shape may be different from a nominal airfoil core shape defined in Table 1, a tolerance of +0.160 and −0.0 inches from the nominal profile is allowed and thus defines an overall design envelope for airfoil core shape 30. The overall design is robust to this design envelope without impairment of mechanical or aerodynamic properties of first stage compressor stator vane 22.

It should also be appreciated that the airfoil core shape 30 can be scaled up or scaled down geometrically for introductions into similar turbine designs, with smaller or larger frame sizes. Consequently, the X, Y, and Z coordinates in inches may be multiplied or divided by the same constant or number/factor to provide a scaled up or scaled down version of first stage stator vane 22 while retaining the airfoil core profile shape and unique properties.

Figure 2:
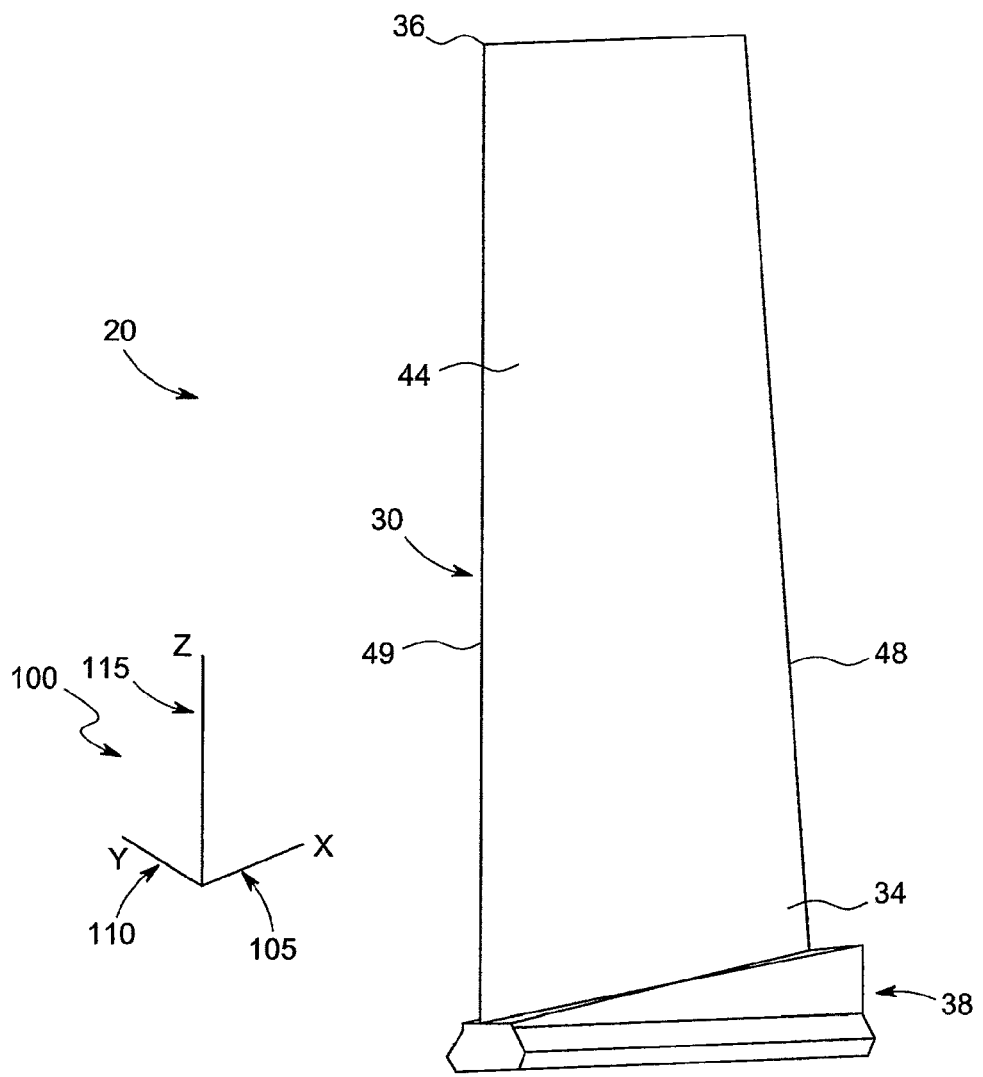
FIG. 2 illustrates a coordinate system for the first stage compressor vane of FIG. 1.

As best shown in FIG. 2, a coordinate system for airfoil core shape 30 in accordance with exemplary embodiment is indicated generally at 100. As discussed above, coordinate system 100 is defined relative to a cold stator vane. Coordinate system 100 includes an X-axis 105, a Y-axis 110, and a Z-axis 115. The origin of coordinate system 100 is centered on a point located on first stage compressor stator vane 22 covered by base member 38. X-axis 105 is directed axially along a centerline axis (not separately labeled) of turbomachine 2 and Z-axis 115 is directed along a radial line normal to the centerline axis. The positive direction of X-axis 105, Y-axis 110, and Z-axis 115 is identified by label placement in FIG. 2.

Figure 3:
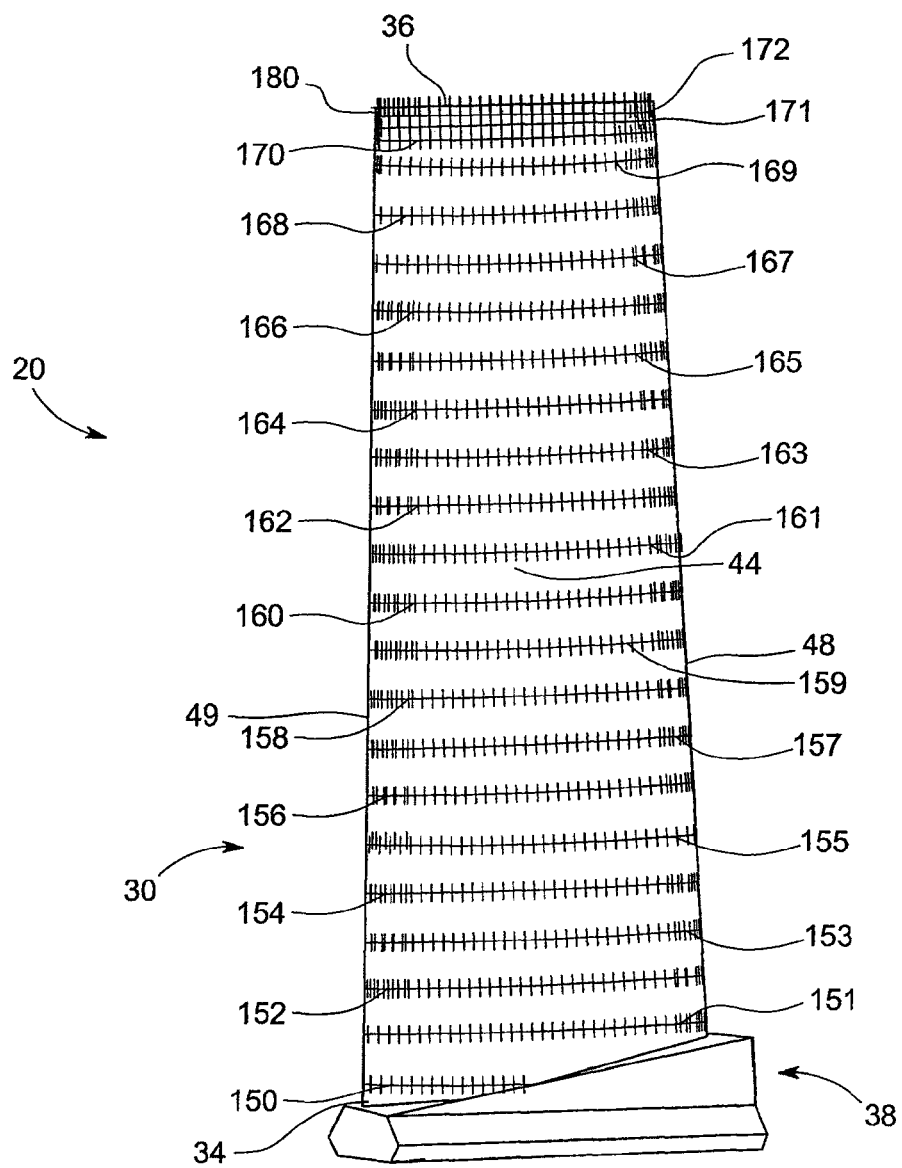
FIG. 3 is a side view of the first stage compressor vane of FIG. 2 illustrating a portion of a set of points that define the airfoil shape.
Figure 4:
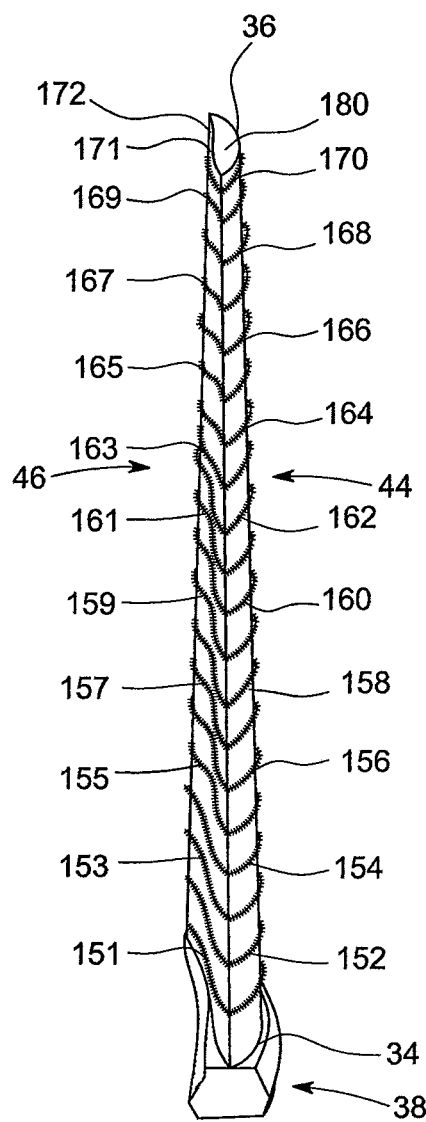
FIG. 4 is another side view of the first stage compressor vane of FIG. 3.
Figure 5:
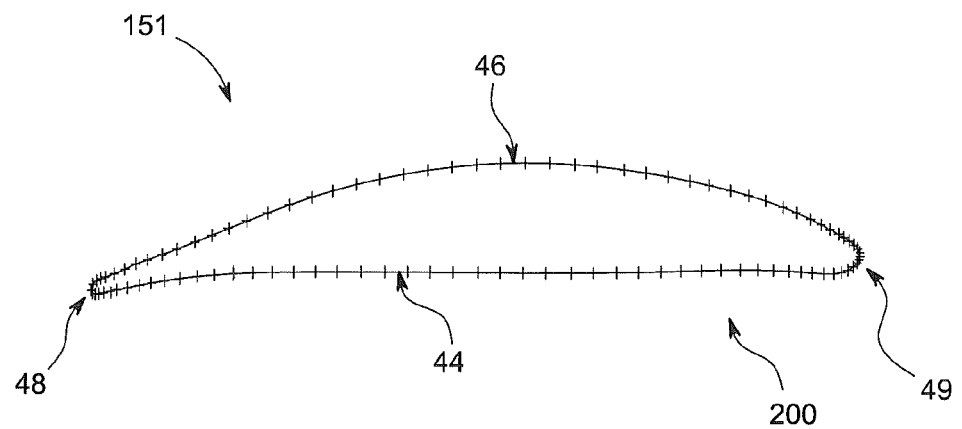
FIG. 5 is a schematic diagram illustrating a typical section of the first stage compressor vane of FIG. 2.

As best shown in FIGS. 3 and 4, airfoil core shape 30 includes a plurality of sections 150-172. Section 150 is located at $Z_0$ and the airfoil core shape 30 extends through sections 172 before terminating at section 180 located at $Z_1$. As discussed above, sections 150-172, and 180 are cut normal to $Z_C$-axis 115. The X and Y coordinates which make up each section are presented in Table 1 are in inches. FIG. 5 illustrates a set of 112 points 200 which make up section 151.

Figure 6:
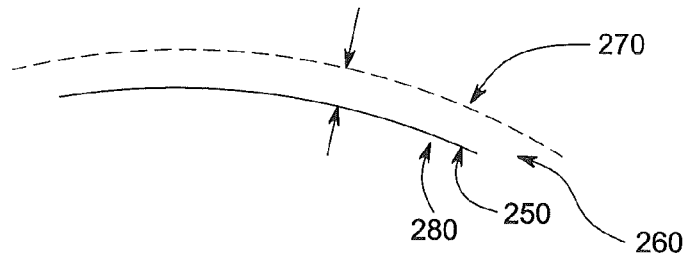
FIG. 6 illustrates an outer envelope of a nominal profile of the airfoil shape.

FIG. 6 illustrates a design envelope for airfoil core shape 30. The X, Y, and Z values listed in TABLE 1 illustrate ideal point location for each point of each section of airfoil core shape 30. However, there exist variations from the ideal point location attributed to manufacturing tolerances and the like which must be taken into account. Thus, a design envelope is established which sets forth an acceptable outer boundary or distance from a nominal profile 250 for each section 150-172, and 180. Therefore it should be understood that each X, Y, and Z point includes a tolerance or ±value. In consideration of process capability, a tolerance 260 of +0.160 inches is allowed in the formation of airfoil core shape 30. Tolerance 260 includes an upper limit 270 defined as a 0.160-inch deviation from nominal profile 250 and a lower limit 280, defined as a −0.000-inch variation from nominal profile 250. The design envelope or tolerance 260 is robust such that this variation does not impair mechanical and aerodynamic performance of compressor stator vane 22.

In no way limiting of the exemplary embodiment, airfoil core shape 30 provides an increased efficiency as much as 0.15% compared to previous individual airfoil core shapes for first stage compressor stator vane 22. Moreover, and in no way limiting of the exemplary embodiment, in conjunction with other airfoil core shapes, which are conventional or enhanced (similar to the enhancements herein), airfoil core shape 30, as embodied by the invention, provides an increased efficiency as much as 0.15% compared to previous individual sets of airfoil core shapes for first stage compressor stator vane 22. This increased efficiency provides, in addition to the above-noted advantages, a power output with a decrease the required fuel, therefore inherently decreasing emissions to produce energy. Of course, other such advantages are within the scope of the exemplary embodiment.

TABLE 1

| Section 1 | | | Section 2 | | | Section 3 | | |
| --- | --- | --- | --- | --- | --- | --- | --- | --- |
| X | Y | Z | X | Y | Z | X | Y | Z |
| −2.5518 | 0.3663 | −0.0374 | −2.5514 | 0.3658 | 0 | −2.544 | 0.3586 | 0.7264 |
| −2.5535 | 0.3574 | −0.0374 | −2.5531 | 0.3569 | 0 | −2.5456 | 0.3497 | 0.7264 |
| −2.5531 | 0.3453 | −0.0374 | −2.5527 | 0.3448 | 0 | −2.5448 | 0.3378 | 0.7264 |
| −2.5493 | 0.3307 | −0.0374 | −2.5489 | 0.3302 | 0 | −2.5404 | 0.3235 | 0.7264 |
| −2.5415 | 0.3144 | −0.0374 | −2.5411 | 0.3139 | 0 | −2.5321 | 0.3077 | 0.7264 |
| −2.5281 | 0.2945 | −0.0374 | −2.5276 | 0.2941 | 0 | −2.518 | 0.2885 | 0.7264 |
| −2.5075 | 0.2711 | −0.0374 | −2.5071 | 0.2707 | 0 | −2.4969 | 0.2661 | 0.7264 |
| −2.4794 | 0.2445 | −0.0374 | −2.4789 | 0.2442 | 0 | −2.4681 | 0.2408 | 0.7264 |
| −2.4429 | 0.2149 | −0.0374 | −2.4423 | 0.2146 | 0 | −2.4309 | 0.2125 | 0.7264 |
| −2.3973 | 0.1821 | −0.0374 | −2.3967 | 0.1819 | 0 | −2.3848 | 0.1815 | 0.7264 |
| −2.3425 | 0.1464 | −0.0374 | −2.3419 | 0.1463 | 0 | −2.3296 | 0.1477 | 0.7264 |
| −2.2765 | 0.1066 | −0.0374 | −2.2759 | 0.1066 | 0 | −2.2632 | 0.11 | 0.7264 |
| −2.199 | 0.0631 | −0.0374 | −2.1984 | 0.0632 | 0 | −2.1855 | 0.0686 | 0.7264 |
| −2.1098 | 0.0168 | −0.0374 | −2.1091 | 0.017 | 0 | −2.096 | 0.0244 | 0.7264 |
| −2.0083 | −0.0318 | −0.0374 | −2.0077 | −0.0314 | 0 | −1.9943 | −0.0218 | 0.7264 |
| −1.8937 | −0.0807 | −0.0374 | −1.893 | −0.0802 | 0 | −1.8797 | −0.0683 | 0.7264 |
| −1.7667 | −0.131 | −0.0374 | −1.7661 | −0.1305 | 0 | −1.7532 | −0.1161 | 0.7264 |
| −1.633 | −0.1783 | −0.0374 | −1.6324 | −0.1777 | 0 | −1.6201 | −0.1612 | 0.7264 |
| −1.4928 | −0.223 | −0.0374 | −1.4923 | −0.2222 | 0 | −1.4807 | −0.2039 | 0.7264 |
| −1.3462 | −0.2655 | −0.0374 | −1.3456 | −0.2646 | 0 | −1.3348 | −0.2444 | 0.7264 |
| −1.1929 | −0.3049 | −0.0374 | −1.1924 | −0.304 | 0 | −1.1824 | −0.282 | 0.7264 |
| −1.0329 | −0.3409 | −0.0374 | −1.0325 | −0.3398 | 0 | −1.0234 | −0.3163 | 0.7264 |
| −0.8661 | −0.373 | −0.0374 | −0.8657 | −0.3718 | 0 | −0.8577 | −0.3471 | 0.7264 |
| −0.6925 | −0.4008 | −0.0374 | −0.6922 | −0.3996 | 0 | −0.6853 | −0.374 | 0.7264 |
| −0.5177 | −0.423 | −0.0374 | −0.5174 | −0.4218 | 0 | −0.5117 | −0.3956 | 0.7264 |
| −0.3417 | −0.4395 | −0.0374 | −0.3414 | −0.4383 | 0 | −0.3371 | −0.4119 | 0.7264 |
| −0.1644 | −0.45 | −0.0374 | −0.1643 | −0.4488 | 0 | −0.1612 | −0.4225 | 0.7264 |
| 0.0128 | −0.454 | −0.0374 | 0.0129 | −0.4528 | 0 | 0.0147 | −0.4271 | 0.7264 |

TABLE 1-continued

| | | | | | | | | |
|---|---|---|---|---|---|---|---|---|
| 0.1892 | −0.451 | −0.0374 | 0.1892 | −0.4499 | 0 | 0.1898 | −0.4254 | 0.7264 |
| 0.3647 | −0.4411 | −0.0374 | 0.3646 | −0.44 | 0 | 0.3641 | −0.4171 | 0.7264 |
| 0.5394 | −0.4248 | −0.0374 | 0.5393 | −0.4238 | 0 | 0.5377 | −0.4029 | 0.7264 |
| 0.7133 | −0.4026 | −0.0374 | 0.7131 | −0.4018 | 0 | 0.7106 | −0.3831 | 0.7264 |
| 0.8865 | −0.3747 | −0.0374 | 0.8863 | −0.374 | 0 | 0.8828 | −0.3579 | 0.7264 |
| 1.059 | −0.3415 | −0.0374 | 1.0587 | −0.341 | 0 | 1.0544 | −0.3279 | 0.7264 |
| 1.2309 | −0.3035 | −0.0374 | 1.2306 | −0.3031 | 0 | 1.2255 | −0.2933 | 0.7264 |
| 1.3965 | −0.2624 | −0.0374 | 1.3961 | −0.2621 | 0 | 1.3903 | −0.2556 | 0.7264 |
| 1.5558 | −0.2188 | −0.0374 | 1.5555 | −0.2188 | 0 | 1.549 | −0.2156 | 0.7264 |
| 1.7087 | −0.1737 | −0.0374 | 1.7083 | −0.1738 | 0 | 1.7015 | −0.1738 | 0.7264 |
| 1.855 | −0.1274 | −0.0374 | 1.8546 | −0.1276 | 0 | 1.8475 | −0.1308 | 0.7264 |
| 1.9949 | −0.0806 | −0.0374 | 1.9945 | −0.081 | 0 | 1.9873 | −0.0872 | 0.7264 |
| 2.1286 | −0.0338 | −0.0374 | 2.1282 | −0.0343 | 0 | 2.1209 | −0.0435 | 0.7264 |
| 2.2563 | 0.0126 | −0.0374 | 2.2558 | 0.012 | 0 | 2.2484 | 0 | 0.7264 |
| 2.3779 | 0.0582 | −0.0374 | 2.3775 | 0.0574 | 0 | 2.37 | 0.0427 | 0.7264 |
| 2.4882 | 0.1004 | −0.0374 | 2.4877 | 0.0995 | 0 | 2.4803 | 0.0823 | 0.7264 |
| 2.5872 | 0.1389 | −0.0374 | 2.5868 | 0.1379 | 0 | 2.5793 | 0.1184 | 0.7264 |
| 2.6752 | 0.1731 | −0.0374 | 2.6748 | 0.172 | 0 | 2.6674 | 0.1505 | 0.7264 |
| 2.7583 | 0.2038 | −0.0374 | 2.7579 | 0.2026 | 0 | 2.7504 | 0.1792 | 0.7264 |
| 2.8307 | 0.2293 | −0.0374 | 2.8303 | 0.228 | 0 | 2.8227 | 0.2031 | 0.7264 |
| 2.8862 | 0.2494 | −0.0374 | 2.8858 | 0.248 | 0 | 2.8782 | 0.2219 | 0.7264 |
| 2.9304 | 0.2662 | −0.0374 | 2.9299 | 0.2648 | 0 | 2.9223 | 0.2378 | 0.7264 |
| 2.9632 | 0.2795 | −0.0374 | 2.9628 | 0.2781 | 0 | 2.9551 | 0.2503 | 0.7264 |
| 2.9822 | 0.2977 | −0.0374 | 2.9818 | 0.2961 | 0 | 2.9748 | 0.2671 | 0.7264 |
| 2.9868 | 0.3117 | −0.0374 | 2.9865 | 0.3102 | 0 | 2.9798 | 0.2807 | 0.7264 |
| 2.9872 | 0.3212 | −0.0374 | 2.9868 | 0.3197 | 0 | 2.9804 | 0.29 | 0.7264 |
| 2.9865 | 0.326 | −0.0374 | 2.9862 | 0.3245 | 0 | 2.9798 | 0.2946 | 0.7264 |
| 2.986 | 0.3283 | −0.0374 | 2.9857 | 0.3268 | 0 | 2.9794 | 0.2969 | 0.7264 |
| 2.9857 | 0.3295 | −0.0374 | 2.9854 | 0.328 | 0 | 2.9791 | 0.2981 | 0.7264 |
| 2.9854 | 0.3306 | −0.0374 | 2.9851 | 0.329 | 0 | 2.9788 | 0.2991 | 0.7264 |
| 2.9847 | 0.3327 | −0.0374 | 2.9844 | 0.3311 | 0 | 2.9781 | 0.3013 | 0.7264 |
| 2.9829 | 0.3368 | −0.0374 | 2.9826 | 0.3352 | 0 | 2.9764 | 0.3053 | 0.7264 |
| 2.9782 | 0.3443 | −0.0374 | 2.9779 | 0.3428 | 0 | 2.9717 | 0.3129 | 0.7264 |
| 2.9681 | 0.3537 | −0.0374 | 2.9678 | 0.3521 | 0 | 2.9614 | 0.322 | 0.7264 |
| 2.9444 | 0.3604 | −0.0374 | 2.9441 | 0.3588 | 0 | 2.9375 | 0.3277 | 0.7264 |
| 2.9113 | 0.3553 | −0.0374 | 2.911 | 0.3537 | 0 | 2.9043 | 0.3228 | 0.7264 |
| 2.8673 | 0.3474 | −0.0374 | 2.8669 | 0.3458 | 0 | 2.8603 | 0.3155 | 0.7264 |
| 2.8123 | 0.3371 | −0.0374 | 2.812 | 0.3355 | 0 | 2.8053 | 0.3058 | 0.7264 |
| 2.7408 | 0.3238 | −0.0374 | 2.7405 | 0.3223 | 0 | 2.7338 | 0.2932 | 0.7264 |
| 2.658 | 0.3107 | −0.0374 | 2.6577 | 0.3093 | 0 | 2.6509 | 0.2808 | 0.7264 |
| 2.5692 | 0.3001 | −0.0374 | 2.5689 | 0.2986 | 0 | 2.5623 | 0.2707 | 0.7264 |
| 2.4691 | 0.2903 | −0.0374 | 2.4688 | 0.2888 | 0 | 2.4625 | 0.2613 | 0.7264 |
| 2.3578 | 0.2813 | −0.0374 | 2.3576 | 0.2798 | 0 | 2.3515 | 0.2526 | 0.7264 |
| 2.2353 | 0.2736 | −0.0374 | 2.235 | 0.2721 | 0 | 2.2293 | 0.245 | 0.7264 |
| 2.1071 | 0.2677 | −0.0374 | 2.1068 | 0.2663 | 0 | 2.1013 | 0.2393 | 0.7264 |
| 1.9732 | 0.2639 | −0.0374 | 1.973 | 0.2624 | 0 | 1.9677 | 0.2354 | 0.7264 |
| 1.8336 | 0.2621 | −0.0374 | 1.8334 | 0.2607 | 0 | 1.8284 | 0.2335 | 0.7264 |
| 1.6883 | 0.2624 | −0.0374 | 1.6881 | 0.2609 | 0 | 1.6835 | 0.2336 | 0.7264 |
| 1.5375 | 0.2645 | −0.0374 | 1.5373 | 0.2631 | 0 | 1.5332 | 0.2356 | 0.7264 |
| 1.3812 | 0.2686 | −0.0374 | 1.3811 | 0.2671 | 0 | 1.3773 | 0.2395 | 0.7264 |
| 1.2194 | 0.2745 | −0.0374 | 1.2193 | 0.273 | 0 | 1.216 | 0.2452 | 0.7264 |
| 1.0521 | 0.282 | −0.0374 | 1.052 | 0.2804 | 0 | 1.0492 | 0.2525 | 0.7264 |
| 0.8848 | 0.2907 | −0.0374 | 0.8847 | 0.2891 | 0 | 0.8825 | 0.2611 | 0.7264 |
| 0.7176 | 0.3004 | −0.0374 | 0.7175 | 0.2988 | 0 | 0.7157 | 0.2706 | 0.7264 |
| 0.5503 | 0.3104 | −0.0374 | 0.5503 | 0.3088 | 0 | 0.5491 | 0.2806 | 0.7264 |
| 0.3831 | 0.3205 | −0.0374 | 0.3831 | 0.3189 | 0 | 0.3824 | 0.2908 | 0.7264 |
| 0.2159 | 0.3304 | −0.0374 | 0.2159 | 0.3288 | 0 | 0.2157 | 0.3007 | 0.7264 |
| 0.0487 | 0.3395 | −0.0374 | 0.0487 | 0.3378 | 0 | 0.049 | 0.31 | 0.7264 |
| −0.1186 | 0.3476 | −0.0374 | −0.1186 | 0.3459 | 0 | −0.1178 | 0.3186 | 0.7264 |
| −0.286 | 0.3552 | −0.0374 | −0.2859 | 0.3535 | 0 | −0.2845 | 0.3268 | 0.7264 |
| −0.4533 | 0.3629 | −0.0374 | −0.4532 | 0.3612 | 0 | −0.4513 | 0.3352 | 0.7264 |
| −0.6206 | 0.3707 | −0.0374 | −0.6205 | 0.3691 | 0 | −0.618 | 0.3438 | 0.7264 |
| −0.7879 | 0.379 | −0.0374 | −0.7877 | 0.3774 | 0 | −0.7848 | 0.3527 | 0.7264 |
| −0.9496 | 0.3874 | −0.0374 | −0.9494 | 0.3859 | 0 | −0.9459 | 0.3619 | 0.7264 |
| −1.1057 | 0.3958 | −0.0374 | −1.1055 | 0.3943 | 0 | −1.1015 | 0.3711 | 0.7264 |
| −1.2562 | 0.4039 | −0.0374 | −1.256 | 0.4025 | 0 | −1.2515 | 0.3802 | 0.7264 |
| −1.4012 | 0.4118 | −0.0374 | −1.4009 | 0.4105 | 0 | −1.396 | 0.389 | 0.7264 |
| −1.5405 | 0.4196 | −0.0374 | −1.5402 | 0.4183 | 0 | −1.5349 | 0.3977 | 0.7264 |
| −1.6743 | 0.4267 | −0.0374 | −1.674 | 0.4254 | 0 | −1.6682 | 0.4058 | 0.7264 |
| −1.8026 | 0.4327 | −0.0374 | −1.8023 | 0.4315 | 0 | −1.796 | 0.4133 | 0.7264 |
| −1.9198 | 0.4374 | −0.0374 | −1.9194 | 0.4363 | 0 | −1.9127 | 0.4195 | 0.7264 |
| −2.0258 | 0.4398 | −0.0374 | −2.0255 | 0.4388 | 0 | −2.0184 | 0.4234 | 0.7264 |
| −2.1207 | 0.4408 | −0.0374 | −2.1204 | 0.4399 | 0 | −2.113 | 0.4257 | 0.7264 |
| −2.2045 | 0.4406 | −0.0374 | −2.2041 | 0.4398 | 0 | −2.1966 | 0.4266 | 0.7264 |
| −2.2771 | 0.4394 | −0.0374 | −2.2767 | 0.4386 | 0 | −2.2689 | 0.4264 | 0.7264 |
| −2.3384 | 0.4367 | −0.0374 | −2.338 | 0.436 | 0 | −2.3301 | 0.4248 | 0.7264 |
| −2.3908 | 0.4326 | −0.0374 | −2.3903 | 0.4319 | 0 | −2.3824 | 0.4216 | 0.7264 |
| −2.4345 | 0.4269 | −0.0374 | −2.4341 | 0.4262 | 0 | −2.4261 | 0.4166 | 0.7264 |
| −2.47 | 0.4196 | −0.0374 | −2.4696 | 0.419 | 0 | −2.4617 | 0.4101 | 0.7264 |
| −2.4978 | 0.4112 | −0.0374 | −2.4974 | 0.4106 | 0 | −2.4895 | 0.4023 | 0.7264 |

TABLE 1-continued

| X | Y | Z | X | Y | Z | X | Y | Z |
|---|---|---|---|---|---|---|---|---|
| −2.5182 | 0.4021 | −0.0374 | −2.5178 | 0.4016 | 0 | −2.51 | 0.3937 | 0.7264 |
| −2.5323 | 0.393 | −0.0374 | −2.5319 | 0.3925 | 0 | −2.5243 | 0.385 | 0.7264 |
| −2.5424 | 0.3834 | −0.0374 | −2.542 | 0.3828 | 0 | −2.5346 | 0.3755 | 0.7264 |
| −2.5486 | 0.3741 | −0.0374 | −2.5482 | 0.3736 | 0 | −2.5409 | 0.3664 | 0.7264 |

| Section 4 | | | Section 5 | | | Section 6 | | |
|---|---|---|---|---|---|---|---|---|
| X | Y | Z | X | Y | Z | X | Y | Z |
| −2.5431 | 0.358 | 0.8 | −2.5292 | 0.3534 | 1.4903 | −2.5008 | 0.347 | 2.2542 |
| −2.5446 | 0.3492 | 0.8 | −2.5305 | 0.3447 | 1.4903 | −2.502 | 0.3383 | 2.2542 |
| −2.5437 | 0.3373 | 0.8 | −2.5293 | 0.3329 | 1.4903 | −2.5008 | 0.3267 | 2.2542 |
| −2.5393 | 0.323 | 0.8 | −2.5244 | 0.319 | 1.4903 | −2.4959 | 0.313 | 2.2542 |
| −2.5309 | 0.3073 | 0.8 | −2.5155 | 0.3037 | 1.4903 | −2.4871 | 0.298 | 2.2542 |
| −2.5167 | 0.2882 | 0.8 | −2.5007 | 0.2853 | 1.4903 | −2.4724 | 0.28 | 2.2542 |
| −2.4955 | 0.2659 | 0.8 | −2.4791 | 0.264 | 1.4903 | −2.4508 | 0.2593 | 2.2542 |
| −2.4667 | 0.2407 | 0.8 | −2.4499 | 0.2398 | 1.4903 | −2.4214 | 0.2362 | 2.2542 |
| −2.4295 | 0.2126 | 0.8 | −2.4123 | 0.2129 | 1.4903 | −2.3835 | 0.2109 | 2.2542 |
| −2.3834 | 0.1817 | 0.8 | −2.366 | 0.1834 | 1.4903 | −2.3368 | 0.1835 | 2.2542 |
| −2.3281 | 0.1481 | 0.8 | −2.3106 | 0.1513 | 1.4903 | −2.2811 | 0.1536 | 2.2542 |
| −2.2617 | 0.1105 | 0.8 | −2.2441 | 0.1154 | 1.4903 | −2.2147 | 0.1197 | 2.2542 |
| −2.1839 | 0.0693 | 0.8 | −2.1664 | 0.076 | 1.4903 | −2.1373 | 0.082 | 2.2542 |
| −2.0945 | 0.0254 | 0.8 | −2.077 | 0.0339 | 1.4903 | −2.0483 | 0.0416 | 2.2542 |
| −1.9928 | −0.0206 | 0.8 | −1.9756 | −0.0101 | 1.4903 | −1.9475 | −0.0003 | 2.2542 |
| −1.8782 | −0.0669 | 0.8 | −1.8615 | −0.0545 | 1.4903 | −1.8347 | −0.0426 | 2.2542 |
| −1.7517 | −0.1144 | 0.8 | −1.7358 | −0.0998 | 1.4903 | −1.7104 | −0.0857 | 2.2542 |
| −1.6188 | −0.1593 | 0.8 | −1.6037 | −0.1428 | 1.4903 | −1.5799 | −0.1266 | 2.2542 |
| −1.4794 | −0.2018 | 0.8 | −1.4653 | −0.1836 | 1.4903 | −1.4431 | −0.1656 | 2.2542 |
| −1.3336 | −0.2422 | 0.8 | −1.3206 | −0.2224 | 1.4903 | −1.3001 | −0.2028 | 2.2542 |
| −1.1813 | −0.2796 | 0.8 | −1.1694 | −0.2584 | 1.4903 | −1.1508 | −0.2374 | 2.2542 |
| −1.0224 | −0.3138 | 0.8 | −1.0118 | −0.2914 | 1.4903 | −0.995 | −0.2692 | 2.2542 |
| −0.8569 | −0.3445 | 0.8 | −0.8476 | −0.3211 | 1.4903 | −0.8327 | −0.298 | 2.2542 |
| −0.6846 | −0.3713 | 0.8 | −0.6767 | −0.347 | 1.4903 | −0.6639 | −0.3232 | 2.2542 |
| −0.5112 | −0.3928 | 0.8 | −0.5048 | −0.368 | 1.4903 | −0.494 | −0.3437 | 2.2542 |
| −0.3366 | −0.409 | 0.8 | −0.3319 | −0.384 | 1.4903 | −0.323 | −0.3595 | 2.2542 |
| −0.161 | −0.4197 | 0.8 | −0.1578 | −0.3947 | 1.4903 | −0.1514 | −0.3703 | 2.2542 |
| 0.0148 | −0.4244 | 0.8 | 0.0164 | −0.3997 | 1.4903 | 0.0198 | −0.3758 | 2.2542 |
| 0.1898 | −0.4227 | 0.8 | 0.1899 | −0.3988 | 1.4903 | 0.1906 | −0.3756 | 2.2542 |
| 0.364 | −0.4146 | 0.8 | 0.3627 | −0.3919 | 1.4903 | 0.3608 | −0.3699 | 2.2542 |
| 0.5375 | −0.4005 | 0.8 | 0.5349 | −0.3793 | 1.4903 | 0.5307 | −0.3587 | 2.2542 |
| 0.7103 | −0.3809 | 0.8 | 0.7064 | −0.3613 | 1.4903 | 0.7001 | −0.3425 | 2.2542 |
| 0.8824 | −0.356 | 0.8 | 0.8773 | −0.3384 | 1.4903 | 0.8691 | −0.3216 | 2.2542 |
| 1.0539 | −0.3262 | 0.8 | 1.0478 | −0.311 | 1.4903 | 1.0377 | −0.2965 | 2.2542 |
| 1.2248 | −0.292 | 0.8 | 1.2177 | −0.2793 | 1.4903 | 1.206 | −0.2674 | 2.2542 |
| 1.3895 | −0.2546 | 0.8 | 1.3814 | −0.2447 | 1.4903 | 1.3684 | −0.2354 | 2.2542 |
| 1.5481 | −0.2149 | 0.8 | 1.5392 | −0.2078 | 1.4903 | 1.5249 | −0.2012 | 2.2542 |
| 1.7006 | −0.1735 | 0.8 | 1.6909 | −0.1691 | 1.4903 | 1.6751 | −0.1653 | 2.2542 |
| 1.8466 | −0.1308 | 0.8 | 1.8363 | −0.1292 | 1.4903 | 1.8191 | −0.1282 | 2.2542 |
| 1.9863 | −0.0875 | 0.8 | 1.9755 | −0.0886 | 1.4903 | 1.957 | −0.0904 | 2.2542 |
| 2.1199 | −0.0441 | 0.8 | 2.1086 | −0.0478 | 1.4903 | 2.0889 | −0.0523 | 2.2542 |
| 2.2474 | −0.001 | 0.8 | 2.2357 | −0.0072 | 1.4903 | 2.2149 | −0.0144 | 2.2542 |
| 2.369 | 0.0415 | 0.8 | 2.3568 | 0.0328 | 1.4903 | 2.3351 | 0.0231 | 2.2542 |
| 2.4792 | 0.0808 | 0.8 | 2.4668 | 0.0698 | 1.4903 | 2.4442 | 0.0578 | 2.2542 |
| 2.5783 | 0.1167 | 0.8 | 2.5656 | 0.1036 | 1.4903 | 2.5422 | 0.0895 | 2.2542 |
| 2.6663 | 0.1486 | 0.8 | 2.6534 | 0.1337 | 1.4903 | 2.6292 | 0.1177 | 2.2542 |
| 2.7493 | 0.1771 | 0.8 | 2.7362 | 0.1605 | 1.4903 | 2.7113 | 0.1429 | 2.2542 |
| 2.8217 | 0.2007 | 0.8 | 2.8082 | 0.1827 | 1.4903 | 2.7827 | 0.1638 | 2.2542 |
| 2.8771 | 0.2194 | 0.8 | 2.8635 | 0.2003 | 1.4903 | 2.8374 | 0.1804 | 2.2542 |
| 2.9212 | 0.2352 | 0.8 | 2.9075 | 0.2152 | 1.4903 | 2.881 | 0.1945 | 2.2542 |
| 2.954 | 0.2477 | 0.8 | 2.9402 | 0.2271 | 1.4903 | 2.9134 | 0.2057 | 2.2542 |
| 2.9738 | 0.2643 | 0.8 | 2.9607 | 0.2423 | 1.4903 | 2.9351 | 0.219 | 2.2542 |
| 2.9789 | 0.2779 | 0.8 | 2.9663 | 0.2555 | 1.4903 | 2.9416 | 0.2319 | 2.2542 |
| 2.9795 | 0.2872 | 0.8 | 2.9671 | 0.2646 | 1.4903 | 2.9428 | 0.2412 | 2.2542 |
| 2.979 | 0.2918 | 0.8 | 2.9666 | 0.2692 | 1.4903 | 2.9425 | 0.2458 | 2.2542 |
| 2.9785 | 0.2941 | 0.8 | 2.9662 | 0.2715 | 1.4903 | 2.9421 | 0.2481 | 2.2542 |
| 2.9783 | 0.2953 | 0.8 | 2.966 | 0.2726 | 1.4903 | 2.9418 | 0.2493 | 2.2542 |
| 2.978 | 0.2963 | 0.8 | 2.9657 | 0.2737 | 1.4903 | 2.9415 | 0.2503 | 2.2542 |
| 2.9773 | 0.2984 | 0.8 | 2.965 | 0.2758 | 1.4903 | 2.9409 | 0.2524 | 2.2542 |
| 2.9756 | 0.3025 | 0.8 | 2.9634 | 0.2798 | 1.4903 | 2.9392 | 0.2564 | 2.2542 |
| 2.9709 | 0.31 | 0.8 | 2.9586 | 0.2873 | 1.4903 | 2.9345 | 0.2638 | 2.2542 |
| 2.9606 | 0.3192 | 0.8 | 2.9482 | 0.2962 | 1.4903 | 2.9239 | 0.2723 | 2.2542 |
| 2.9366 | 0.3248 | 0.8 | 2.9242 | 0.3008 | 1.4903 | 2.8998 | 0.2755 | 2.2542 |
| 2.9035 | 0.3199 | 0.8 | 2.8911 | 0.2961 | 1.4903 | 2.8671 | 0.2711 | 2.2542 |
| 2.8594 | 0.3126 | 0.8 | 2.8472 | 0.2894 | 1.4903 | 2.8235 | 0.2646 | 2.2542 |
| 2.8044 | 0.303 | 0.8 | 2.7924 | 0.2803 | 1.4903 | 2.7692 | 0.2559 | 2.2542 |
| 2.733 | 0.2905 | 0.8 | 2.7211 | 0.2683 | 1.4903 | 2.6985 | 0.2445 | 2.2542 |
| 2.6501 | 0.2782 | 0.8 | 2.6387 | 0.2565 | 1.4903 | 2.6168 | 0.2332 | 2.2542 |
| 2.5616 | 0.2682 | 0.8 | 2.5505 | 0.2469 | 1.4903 | 2.5294 | 0.2238 | 2.2542 |
| 2.4618 | 0.2588 | 0.8 | 2.4512 | 0.2379 | 1.4903 | 2.431 | 0.215 | 2.2542 |
| 2.3508 | 0.2501 | 0.8 | 2.3407 | 0.2294 | 1.4903 | 2.3216 | 0.2067 | 2.2542 |

TABLE 1-continued

| X | Y | Z | X | Y | Z | X | Y | Z |
|---|---|---|---|---|---|---|---|---|
| 2.2286 | 0.2426 | 0.8 | 2.219 | 0.2221 | 1.4903 | 2.201 | 0.1994 | 2.2542 |
| 2.1007 | 0.2369 | 0.8 | 2.0917 | 0.2164 | 1.4903 | 2.0749 | 0.1938 | 2.2542 |
| 1.9671 | 0.233 | 0.8 | 1.9588 | 0.2125 | 1.4903 | 1.9431 | 0.1898 | 2.2542 |
| 1.8278 | 0.2311 | 0.8 | 1.8201 | 0.2105 | 1.4903 | 1.8059 | 0.1877 | 2.2542 |
| 1.683 | 0.2312 | 0.8 | 1.6761 | 0.2105 | 1.4903 | 1.6632 | 0.1876 | 2.2542 |
| 1.5327 | 0.2332 | 0.8 | 1.5265 | 0.2125 | 1.4903 | 1.5151 | 0.1893 | 2.2542 |
| 1.377 | 0.2371 | 0.8 | 1.3715 | 0.2162 | 1.4903 | 1.3616 | 0.1928 | 2.2542 |
| 1.2157 | 0.2428 | 0.8 | 1.2111 | 0.2218 | 1.4903 | 1.2027 | 0.1981 | 2.2542 |
| 1.0489 | 0.2501 | 0.8 | 1.0452 | 0.2289 | 1.4903 | 1.0384 | 0.205 | 2.2542 |
| 0.8823 | 0.2587 | 0.8 | 0.8793 | 0.2373 | 1.4903 | 0.8742 | 0.2131 | 2.2542 |
| 0.7156 | 0.2682 | 0.8 | 0.7135 | 0.2467 | 1.4903 | 0.71 | 0.2222 | 2.2542 |
| 0.549 | 0.2783 | 0.8 | 0.5478 | 0.2566 | 1.4903 | 0.5458 | 0.2321 | 2.2542 |
| 0.3824 | 0.2884 | 0.8 | 0.382 | 0.2667 | 1.4903 | 0.3816 | 0.2421 | 2.2542 |
| 0.2157 | 0.2984 | 0.8 | 0.2162 | 0.2766 | 1.4903 | 0.2175 | 0.252 | 2.2542 |
| 0.0491 | 0.3076 | 0.8 | 0.0504 | 0.286 | 1.4903 | 0.0533 | 0.2615 | 2.2542 |
| −0.1176 | 0.3163 | 0.8 | −0.1154 | 0.2949 | 1.4903 | −0.1109 | 0.2707 | 2.2542 |
| −0.2843 | 0.3246 | 0.8 | −0.2813 | 0.3036 | 1.4903 | −0.2751 | 0.2799 | 2.2542 |
| −0.451 | 0.333 | 0.8 | −0.4471 | 0.3124 | 1.4903 | −0.4393 | 0.2893 | 2.2542 |
| −0.6177 | 0.3416 | 0.8 | −0.6129 | 0.3215 | 1.4903 | −0.6035 | 0.299 | 2.2542 |
| −0.7844 | 0.3507 | 0.8 | −0.7787 | 0.3311 | 1.4903 | −0.7676 | 0.3093 | 2.2542 |
| −0.9455 | 0.3599 | 0.8 | −0.9389 | 0.3409 | 1.4903 | −0.9263 | 0.3198 | 2.2542 |
| −1.101 | 0.3692 | 0.8 | −1.0936 | 0.3508 | 1.4903 | −1.0794 | 0.3304 | 2.2542 |
| −1.2509 | 0.3783 | 0.8 | −1.2428 | 0.3606 | 1.4903 | −1.2271 | 0.341 | 2.2542 |
| −1.3953 | 0.3872 | 0.8 | −1.3864 | 0.3702 | 1.4903 | −1.3693 | 0.3513 | 2.2542 |
| −1.5342 | 0.3959 | 0.8 | −1.5245 | 0.3796 | 1.4903 | −1.506 | 0.3615 | 2.2542 |
| −1.6674 | 0.4042 | 0.8 | −1.6571 | 0.3887 | 1.4903 | −1.6372 | 0.3715 | 2.2542 |
| −1.7952 | 0.4117 | 0.8 | −1.7841 | 0.3973 | 1.4903 | −1.763 | 0.3809 | 2.2542 |
| −1.9119 | 0.4181 | 0.8 | −1.9001 | 0.4046 | 1.4903 | −1.8778 | 0.389 | 2.2542 |
| −2.0175 | 0.4221 | 0.8 | −2.0052 | 0.4096 | 1.4903 | −1.9818 | 0.3949 | 2.2542 |
| −2.1121 | 0.4244 | 0.8 | −2.0993 | 0.413 | 1.4903 | −2.075 | 0.3991 | 2.2542 |
| −2.1956 | 0.4255 | 0.8 | −2.1823 | 0.415 | 1.4903 | −2.1572 | 0.4018 | 2.2542 |
| −2.2679 | 0.4254 | 0.8 | −2.2543 | 0.4157 | 1.4903 | −2.2284 | 0.4038 | 2.2542 |
| −2.3291 | 0.4239 | 0.8 | −2.3152 | 0.4149 | 1.4903 | −2.2887 | 0.4047 | 2.2542 |
| −2.3814 | 0.4207 | 0.8 | −2.3672 | 0.4125 | 1.4903 | −2.3403 | 0.4037 | 2.2542 |
| −2.4251 | 0.4159 | 0.8 | −2.4107 | 0.4084 | 1.4903 | −2.3835 | 0.4007 | 2.2542 |
| −2.4606 | 0.4094 | 0.8 | −2.4463 | 0.4026 | 1.4903 | −2.4187 | 0.3955 | 2.2542 |
| −2.4885 | 0.4016 | 0.8 | −2.4741 | 0.3955 | 1.4903 | −2.4464 | 0.3887 | 2.2542 |
| −2.509 | 0.3931 | 0.8 | −2.4947 | 0.3875 | 1.4903 | −2.4668 | 0.3808 | 2.2542 |
| −2.5233 | 0.3844 | 0.8 | −2.5092 | 0.3792 | 1.4903 | −2.4811 | 0.3726 | 2.2542 |
| −2.5336 | 0.375 | 0.8 | −2.5197 | 0.3702 | 1.4903 | −2.4914 | 0.3636 | 2.2542 |
| −2.5399 | 0.3659 | 0.8 | −2.5261 | 0.3612 | 1.4903 | −2.4977 | 0.3547 | 2.2542 |

| Section 7 | | | Section 8 | | | Section 9 | | |
|---|---|---|---|---|---|---|---|---|
| X | Y | Z | X | Y | Z | X | Y | Z |
| −2.458 | 0.3402 | 3.018 | −2.4119 | 0.3349 | 3.7818 | −2.374 | 0.3323 | 4.5457 |
| −2.4592 | 0.3317 | 3.018 | −2.413 | 0.3266 | 3.7818 | −2.3751 | 0.3242 | 4.5457 |
| −2.458 | 0.3203 | 3.018 | −2.4115 | 0.3155 | 3.7818 | −2.3734 | 0.3133 | 4.5457 |
| −2.453 | 0.3068 | 3.018 | −2.4062 | 0.3025 | 3.7818 | −2.3679 | 0.3007 | 4.5457 |
| −2.4441 | 0.2922 | 3.018 | −2.397 | 0.2884 | 3.7818 | −2.3585 | 0.2872 | 4.5457 |
| −2.4293 | 0.2747 | 3.018 | −2.3821 | 0.2718 | 3.7818 | −2.3436 | 0.2712 | 4.5457 |
| −2.4077 | 0.2547 | 3.018 | −2.3605 | 0.2527 | 3.7818 | −2.3221 | 0.2529 | 4.5457 |
| −2.3783 | 0.2326 | 3.018 | −2.3312 | 0.2316 | 3.7818 | −2.293 | 0.2327 | 4.5457 |
| −2.3403 | 0.2086 | 3.018 | −2.2938 | 0.2087 | 3.7818 | −2.2559 | 0.2109 | 4.5457 |
| −2.2937 | 0.1829 | 3.018 | −2.2479 | 0.184 | 3.7818 | −2.2107 | 0.1874 | 4.5457 |
| −2.2382 | 0.1547 | 3.018 | −2.1934 | 0.1569 | 3.7818 | −2.1571 | 0.1614 | 4.5457 |
| −2.1722 | 0.1223 | 3.018 | −2.1285 | 0.1258 | 3.7818 | −2.0932 | 0.1315 | 4.5457 |
| −2.0954 | 0.0861 | 3.018 | −2.053 | 0.0913 | 3.7818 | −2.0188 | 0.0984 | 4.5457 |
| −2.0073 | 0.0475 | 3.018 | −1.9664 | 0.0543 | 3.7818 | −1.9337 | 0.0629 | 4.5457 |
| −1.9076 | 0.0074 | 3.018 | −1.8687 | 0.0159 | 3.7818 | −1.8378 | 0.026 | 4.5457 |
| −1.7965 | −0.0331 | 3.018 | −1.7598 | −0.0229 | 3.7818 | −1.731 | −0.0116 | 4.5457 |
| −1.6741 | −0.0743 | 3.018 | −1.6399 | −0.0625 | 3.7818 | −1.6132 | −0.0499 | 4.5457 |
| −1.5455 | −0.1134 | 3.018 | −1.5138 | −0.1002 | 3.7818 | −1.4895 | −0.0865 | 4.5457 |
| −1.4107 | −0.1508 | 3.018 | −1.3818 | −0.1365 | 3.7818 | −1.3598 | −0.1218 | 4.5457 |
| −1.2699 | −0.1866 | 3.018 | −1.2438 | −0.1712 | 3.7818 | −1.2242 | −0.1556 | 4.5457 |
| −1.1227 | −0.2201 | 3.018 | −1.0996 | −0.2038 | 3.7818 | −1.0826 | −0.1875 | 4.5457 |
| −0.9692 | −0.2509 | 3.018 | −0.9492 | −0.2339 | 3.7818 | −0.9348 | −0.2171 | 4.5457 |
| −0.8092 | −0.2788 | 3.018 | −0.7925 | −0.2613 | 3.7818 | −0.7808 | −0.2443 | 4.5457 |
| −0.6428 | −0.3034 | 3.018 | −0.6294 | −0.2856 | 3.7818 | −0.6205 | −0.2684 | 4.5457 |
| −0.4753 | −0.3235 | 3.018 | −0.4653 | −0.3057 | 3.7818 | −0.4599 | −0.2885 | 4.5457 |
| −0.307 | −0.3391 | 3.018 | −0.3009 | −0.3214 | 3.7818 | −0.2994 | −0.3044 | 4.5457 |
| −0.1389 | −0.3498 | 3.018 | −0.1368 | −0.3325 | 3.7818 | −0.139 | −0.316 | 4.5457 |
| 0.0287 | −0.3555 | 3.018 | 0.027 | −0.3389 | 3.7818 | 0.0213 | −0.3232 | 4.5457 |
| 0.1959 | −0.3559 | 3.018 | 0.1905 | −0.3403 | 3.7818 | 0.1815 | −0.3257 | 4.5457 |
| 0.3627 | −0.351 | 3.018 | 0.3538 | −0.3367 | 3.7818 | 0.3416 | −0.3232 | 4.5457 |
| 0.5292 | −0.341 | 3.018 | 0.5167 | −0.3281 | 3.7818 | 0.5015 | −0.3162 | 4.5457 |
| 0.6952 | −0.3262 | 3.018 | 0.6794 | −0.3152 | 3.7818 | 0.6614 | −0.305 | 4.5457 |
| 0.8609 | −0.3072 | 3.018 | 0.8418 | −0.2981 | 3.7818 | 0.8212 | −0.2899 | 4.5457 |
| 1.0264 | −0.2842 | 3.018 | 1.004 | −0.2774 | 3.7818 | 0.9808 | −0.2712 | 4.5457 |

TABLE 1-continued

| | | | | | | | | |
|---|---|---|---|---|---|---|---|---|
| 1.1915 | −0.2575 | 3.018 | 1.166 | −0.253 | 3.7818 | 1.1404 | −0.2489 | 4.5457 |
| 1.3508 | −0.228 | 3.018 | 1.3224 | −0.226 | 3.7818 | 1.2947 | −0.2241 | 4.5457 |
| 1.5044 | −0.1964 | 3.018 | 1.4733 | −0.1968 | 3.7818 | 1.4433 | −0.1972 | 4.5457 |
| 1.6523 | −0.163 | 3.018 | 1.6185 | −0.166 | 3.7818 | 1.5862 | −0.1687 | 4.5457 |
| 1.7942 | −0.1285 | 3.018 | 1.7578 | −0.1341 | 3.7818 | 1.7233 | −0.1391 | 4.5457 |
| 1.9301 | −0.0934 | 3.018 | 1.8913 | −0.1015 | 3.7818 | 1.8548 | −0.1088 | 4.5457 |
| 2.0602 | −0.0579 | 3.018 | 2.0191 | −0.0685 | 3.7818 | 1.9806 | −0.0781 | 4.5457 |
| 2.1844 | −0.0225 | 3.018 | 2.1412 | −0.0356 | 3.7818 | 2.1008 | −0.0474 | 4.5457 |
| 2.3029 | 0.0125 | 3.018 | 2.2576 | −0.003 | 3.7818 | 2.2156 | −0.0169 | 4.5457 |
| 2.4105 | 0.0449 | 3.018 | 2.3634 | 0.0273 | 3.7818 | 2.3197 | 0.0114 | 4.5457 |
| 2.5071 | 0.0746 | 3.018 | 2.4584 | 0.055 | 3.7818 | 2.4133 | 0.0375 | 4.5457 |
| 2.593 | 0.1011 | 3.018 | 2.5428 | 0.0798 | 3.7818 | 2.4965 | 0.0608 | 4.5457 |
| 2.6739 | 0.1247 | 3.018 | 2.6222 | 0.102 | 3.7818 | 2.5746 | 0.0817 | 4.5457 |
| 2.7442 | 0.1444 | 3.018 | 2.6912 | 0.1206 | 3.7818 | 2.6426 | 0.0993 | 4.5457 |
| 2.7982 | 0.1601 | 3.018 | 2.7442 | 0.1353 | 3.7818 | 2.6947 | 0.1132 | 4.5457 |
| 2.8411 | 0.1734 | 3.018 | 2.7864 | 0.1478 | 3.7818 | 2.7362 | 0.1251 | 4.5457 |
| 2.8731 | 0.1839 | 3.018 | 2.8178 | 0.1578 | 3.7818 | 2.7672 | 0.1345 | 4.5457 |
| 2.8949 | 0.196 | 3.018 | 2.84 | 0.1683 | 3.7818 | 2.7893 | 0.144 | 4.5457 |
| 2.9017 | 0.2083 | 3.018 | 2.8475 | 0.18 | 3.7818 | 2.797 | 0.1549 | 4.5457 |
| 2.9031 | 0.2172 | 3.018 | 2.8492 | 0.1888 | 3.7818 | 2.7988 | 0.1633 | 4.5457 |
| 2.9029 | 0.2217 | 3.018 | 2.849 | 0.1932 | 3.7818 | 2.7987 | 0.1676 | 4.5457 |
| 2.9025 | 0.224 | 3.018 | 2.8487 | 0.1955 | 3.7818 | 2.7985 | 0.1697 | 4.5457 |
| 2.9023 | 0.2251 | 3.018 | 2.8485 | 0.1966 | 3.7818 | 2.7982 | 0.1708 | 4.5457 |
| 2.902 | 0.2262 | 3.018 | 2.8482 | 0.1976 | 3.7818 | 2.798 | 0.1718 | 4.5457 |
| 2.9014 | 0.2282 | 3.018 | 2.8476 | 0.1996 | 3.7818 | 2.7974 | 0.1738 | 4.5457 |
| 2.8998 | 0.2322 | 3.018 | 2.846 | 0.2035 | 3.7818 | 2.7958 | 0.1777 | 4.5457 |
| 2.895 | 0.2394 | 3.018 | 2.8412 | 0.2105 | 3.7818 | 2.7909 | 0.1844 | 4.5457 |
| 2.8843 | 0.2474 | 3.018 | 2.8304 | 0.2179 | 3.7818 | 2.78 | 0.1913 | 4.5457 |
| 2.8604 | 0.2495 | 3.018 | 2.8069 | 0.2189 | 3.7818 | 2.7567 | 0.1912 | 4.5457 |
| 2.8282 | 0.2452 | 3.018 | 2.7753 | 0.2148 | 3.7818 | 2.7256 | 0.1872 | 4.5457 |
| 2.7852 | 0.239 | 3.018 | 2.7333 | 0.2088 | 3.7818 | 2.6841 | 0.1815 | 4.5457 |
| 2.7317 | 0.2306 | 3.018 | 2.6808 | 0.2009 | 3.7818 | 2.6324 | 0.1739 | 4.5457 |
| 2.662 | 0.2197 | 3.018 | 2.6126 | 0.1906 | 3.7818 | 2.5652 | 0.1641 | 4.5457 |
| 2.5815 | 0.2088 | 3.018 | 2.5337 | 0.1803 | 3.7818 | 2.4874 | 0.1544 | 4.5457 |
| 2.4954 | 0.1998 | 3.018 | 2.4493 | 0.1717 | 3.7818 | 2.4043 | 0.1462 | 4.5457 |
| 2.3985 | 0.1913 | 3.018 | 2.3541 | 0.1635 | 3.7818 | 2.3107 | 0.1385 | 4.5457 |
| 2.2906 | 0.1832 | 3.018 | 2.2483 | 0.1559 | 3.7818 | 2.2066 | 0.1313 | 4.5457 |
| 2.1719 | 0.1761 | 3.018 | 2.1319 | 0.1493 | 3.7818 | 2.092 | 0.1251 | 4.5457 |
| 2.0476 | 0.1706 | 3.018 | 2.0102 | 0.1441 | 3.7818 | 1.972 | 0.1203 | 4.5457 |
| 1.9178 | 0.1667 | 3.018 | 1.8832 | 0.1405 | 3.7818 | 1.8468 | 0.117 | 4.5457 |
| 1.7826 | 0.1646 | 3.018 | 1.7508 | 0.1386 | 3.7818 | 1.7165 | 0.1154 | 4.5457 |
| 1.6421 | 0.1643 | 3.018 | 1.6132 | 0.1384 | 3.7818 | 1.581 | 0.1154 | 4.5457 |
| 1.4963 | 0.1659 | 3.018 | 1.4702 | 0.1401 | 3.7818 | 1.4404 | 0.1172 | 4.5457 |
| 1.3452 | 0.1692 | 3.018 | 1.3219 | 0.1435 | 3.7818 | 1.2946 | 0.1207 | 4.5457 |
| 1.1887 | 0.1743 | 3.018 | 1.1683 | 0.1485 | 3.7818 | 1.1437 | 0.1258 | 4.5457 |
| 1.0269 | 0.1809 | 3.018 | 1.0094 | 0.1552 | 3.7818 | 0.9877 | 0.1325 | 4.5457 |
| 0.8651 | 0.1887 | 3.018 | 0.8506 | 0.1631 | 3.7818 | 0.8317 | 0.1404 | 4.5457 |
| 0.7034 | 0.1977 | 3.018 | 0.6919 | 0.172 | 3.7818 | 0.6757 | 0.1494 | 4.5457 |
| 0.5418 | 0.2074 | 3.018 | 0.5332 | 0.1818 | 3.7818 | 0.5198 | 0.1592 | 4.5457 |
| 0.3801 | 0.2174 | 3.018 | 0.3745 | 0.192 | 3.7818 | 0.3639 | 0.1695 | 4.5457 |
| 0.2185 | 0.2273 | 3.018 | 0.2158 | 0.2022 | 3.7818 | 0.208 | 0.18 | 4.5457 |
| 0.0568 | 0.2369 | 3.018 | 0.0571 | 0.2122 | 3.7818 | 0.0521 | 0.1903 | 4.5457 |
| −0.1049 | 0.2465 | 3.018 | −0.1016 | 0.2222 | 3.7818 | −0.1038 | 0.2007 | 4.5457 |
| −0.2666 | 0.2561 | 3.018 | −0.2603 | 0.2323 | 3.7818 | −0.2596 | 0.2114 | 4.5457 |
| −0.4282 | 0.266 | 3.018 | −0.4189 | 0.2429 | 3.7818 | −0.4155 | 0.2225 | 4.5457 |
| −0.5899 | 0.2763 | 3.018 | −0.5776 | 0.254 | 3.7818 | −0.5713 | 0.2343 | 4.5457 |
| −0.7515 | 0.2873 | 3.018 | −0.7361 | 0.2657 | 3.7818 | −0.7271 | 0.2468 | 4.5457 |
| −0.9077 | 0.2985 | 3.018 | −0.8894 | 0.2778 | 3.7818 | −0.8776 | 0.2596 | 4.5457 |
| −1.0584 | 0.3099 | 3.018 | −1.0373 | 0.2899 | 3.7818 | −1.0228 | 0.2726 | 4.5457 |
| −1.2038 | 0.3212 | 3.018 | −1.1799 | 0.3021 | 3.7818 | −1.1629 | 0.2856 | 4.5457 |
| −1.3437 | 0.3323 | 3.018 | −1.3172 | 0.314 | 3.7818 | −1.2977 | 0.2983 | 4.5457 |
| −1.4783 | 0.3432 | 3.018 | −1.4492 | 0.3258 | 3.7818 | −1.4273 | 0.3109 | 4.5457 |
| −1.6074 | 0.354 | 3.018 | −1.5759 | 0.3374 | 3.7818 | −1.5517 | 0.3233 | 4.5457 |
| −1.7312 | 0.3641 | 3.018 | −1.6973 | 0.3483 | 3.7818 | −1.6709 | 0.3351 | 4.5457 |
| −1.8443 | 0.373 | 3.018 | −1.8082 | 0.3579 | 3.7818 | −1.7798 | 0.3454 | 4.5457 |
| −1.9466 | 0.3797 | 3.018 | −1.9086 | 0.3655 | 3.7818 | −1.8784 | 0.3539 | 4.5457 |
| −2.0383 | 0.3847 | 3.018 | −1.9985 | 0.3713 | 3.7818 | −1.9667 | 0.3607 | 4.5457 |
| −2.1192 | 0.3882 | 3.018 | −2.0779 | 0.3758 | 3.7818 | −2.0446 | 0.3661 | 4.5457 |
| −2.1894 | 0.3911 | 3.018 | −2.1467 | 0.3795 | 3.7818 | −2.1122 | 0.3705 | 4.5457 |
| −2.2487 | 0.3933 | 3.018 | −2.205 | 0.3822 | 3.7818 | −2.1694 | 0.374 | 4.5457 |
| −2.2995 | 0.3936 | 3.018 | −2.2548 | 0.3832 | 3.7818 | −2.2183 | 0.3759 | 4.5457 |
| −2.3421 | 0.3915 | 3.018 | −2.2966 | 0.3819 | 3.7818 | −2.2595 | 0.3755 | 4.5457 |
| −2.3768 | 0.3871 | 3.018 | −2.3309 | 0.3783 | 3.7818 | −2.2932 | 0.3728 | 4.5457 |
| −2.4041 | 0.3808 | 3.018 | −2.3579 | 0.3729 | 3.7818 | −2.3198 | 0.3681 | 4.5457 |
| −2.4244 | 0.3733 | 3.018 | −2.3779 | 0.3662 | 3.7818 | −2.3398 | 0.3621 | 4.5457 |
| −2.4385 | 0.3654 | 3.018 | −2.3921 | 0.359 | 3.7818 | −2.3539 | 0.3554 | 4.5457 |
| −2.4487 | 0.3566 | 3.018 | −2.4025 | 0.3508 | 3.7818 | −2.3644 | 0.3477 | 4.5457 |
| −2.455 | 0.3478 | 3.018 | −2.4089 | 0.3423 | 3.7818 | −2.3709 | 0.3396 | 4.5457 |

TABLE 1-continued

| Section 10 | | | Section 11 | | | Section 12 | | |
|---|---|---|---|---|---|---|---|---|
| X | Y | Z | X | Y | Z | X | Y | Z |
| −2.3498 | 0.3355 | 5.3095 | −2.3369 | 0.344 | 6.0734 | −2.324 | 0.3531 | 6.8373 |
| −2.3508 | 0.3274 | 5.3095 | −2.3378 | 0.336 | 6.0734 | −2.3249 | 0.3451 | 6.8373 |
| −2.349 | 0.3167 | 5.3095 | −2.3357 | 0.3255 | 6.0734 | −2.3225 | 0.3347 | 6.8373 |
| −2.3433 | 0.3045 | 5.3095 | −2.3297 | 0.3135 | 6.0734 | −2.3162 | 0.323 | 6.8373 |
| −2.3338 | 0.2913 | 5.3095 | −2.3199 | 0.3007 | 6.0734 | −2.3062 | 0.3107 | 6.8373 |
| −2.3188 | 0.2759 | 5.3095 | −2.3047 | 0.2858 | 6.0734 | −2.2908 | 0.2963 | 6.8373 |
| −2.2972 | 0.2584 | 5.3095 | −2.2829 | 0.2689 | 6.0734 | −2.2687 | 0.28 | 6.8373 |
| −2.2681 | 0.239 | 5.3095 | −2.2537 | 0.2503 | 6.0734 | −2.2395 | 0.2621 | 6.8373 |
| −2.2312 | 0.2182 | 5.3095 | −2.2169 | 0.2303 | 6.0734 | −2.2027 | 0.2427 | 6.8373 |
| −2.1863 | 0.1957 | 5.3095 | −2.1721 | 0.2085 | 6.0734 | −2.1582 | 0.2213 | 6.8373 |
| −2.1332 | 0.1705 | 5.3095 | −2.1193 | 0.1838 | 6.0734 | −2.1058 | 0.197 | 6.8373 |
| −2.07 | 0.1416 | 5.3095 | −2.0565 | 0.1555 | 6.0734 | −2.0434 | 0.1692 | 6.8373 |
| −1.9965 | 0.1095 | 5.3095 | −1.9834 | 0.1242 | 6.0734 | −1.9708 | 0.1384 | 6.8373 |
| −1.9125 | 0.0751 | 5.3095 | −1.9 | 0.0906 | 6.0734 | −1.8881 | 0.1054 | 6.8373 |
| −1.8178 | 0.0394 | 5.3095 | −1.806 | 0.0556 | 6.0734 | −1.7948 | 0.0708 | 6.8373 |
| −1.7123 | 0.0028 | 5.3095 | −1.7014 | 0.0196 | 6.0734 | −1.6909 | 0.0351 | 6.8373 |
| −1.5961 | −0.0346 | 5.3095 | −1.586 | −0.0172 | 6.0734 | −1.5764 | −0.0014 | 6.8373 |
| −1.4739 | −0.0705 | 5.3095 | −1.4647 | −0.0528 | 6.0734 | −1.456 | −0.0368 | 6.8373 |
| −1.3459 | −0.1052 | 5.3095 | −1.3376 | −0.0871 | 6.0734 | −1.3298 | −0.0711 | 6.8373 |
| −1.2119 | −0.1384 | 5.3095 | −1.2045 | −0.1201 | 6.0734 | −1.1977 | −0.104 | 6.8373 |
| −1.072 | −0.1699 | 5.3095 | −1.0655 | −0.1514 | 6.0734 | −1.0597 | −0.1354 | 6.8373 |
| −0.9259 | −0.1992 | 5.3095 | −0.9205 | −0.1807 | 6.0734 | −0.9161 | −0.1647 | 6.8373 |
| −0.7738 | −0.2262 | 5.3095 | −0.7699 | −0.2076 | 6.0734 | −0.7671 | −0.1917 | 6.8373 |
| −0.6161 | −0.2503 | 5.3095 | −0.6141 | −0.2318 | 6.0734 | −0.6129 | −0.2161 | 6.8373 |
| −0.4583 | −0.2705 | 5.3095 | −0.4582 | −0.2522 | 6.0734 | −0.4584 | −0.2368 | 6.8373 |
| −0.3006 | −0.2867 | 5.3095 | −0.3021 | −0.2687 | 6.0734 | −0.3037 | −0.2538 | 6.8373 |
| −0.1428 | −0.2988 | 5.3095 | −0.146 | −0.2813 | 6.0734 | −0.1487 | −0.267 | 6.8373 |
| 0.015 | −0.3068 | 5.3095 | 0.0103 | −0.2899 | 6.0734 | 0.0065 | −0.2762 | 6.8373 |
| 0.1729 | −0.3102 | 5.3095 | 0.1667 | −0.2942 | 6.0734 | 0.1619 | −0.2813 | 6.8373 |
| 0.3308 | −0.3089 | 5.3095 | 0.3231 | −0.2941 | 6.0734 | 0.3176 | −0.2822 | 6.8373 |
| 0.4887 | −0.3033 | 5.3095 | 0.4798 | −0.2897 | 6.0734 | 0.4735 | −0.279 | 6.8373 |
| 0.6466 | −0.2937 | 5.3095 | 0.6365 | −0.2815 | 6.0734 | 0.6296 | −0.2719 | 6.8373 |
| 0.8046 | −0.2803 | 5.3095 | 0.7933 | −0.2697 | 6.0734 | 0.786 | −0.2614 | 6.8373 |
| 0.9625 | −0.2633 | 5.3095 | 0.9502 | −0.2542 | 6.0734 | 0.9426 | −0.2471 | 6.8373 |
| 1.1206 | −0.2429 | 5.3095 | 1.1072 | −0.2353 | 6.0734 | 1.0989 | −0.2294 | 6.8373 |
| 1.2732 | −0.2199 | 5.3095 | 1.2589 | −0.2138 | 6.0734 | 1.2497 | −0.2093 | 6.8373 |
| 1.4202 | −0.1949 | 5.3095 | 1.4049 | −0.1905 | 6.0734 | 1.3949 | −0.1874 | 6.8373 |
| 1.5615 | −0.1685 | 5.3095 | 1.5454 | −0.1657 | 6.0734 | 1.5346 | −0.1639 | 6.8373 |
| 1.6972 | −0.1409 | 5.3095 | 1.6802 | −0.1398 | 6.0734 | 1.6687 | −0.1393 | 6.8373 |
| 1.8272 | −0.1125 | 5.3095 | 1.8096 | −0.1131 | 6.0734 | 1.7974 | −0.1139 | 6.8373 |
| 1.9518 | −0.0837 | 5.3095 | 1.9335 | −0.0859 | 6.0734 | 1.9206 | −0.0879 | 6.8373 |
| 2.0708 | −0.0548 | 5.3095 | 2.0519 | −0.0585 | 6.0734 | 2.0385 | −0.0618 | 6.8373 |
| 2.1844 | −0.0262 | 5.3095 | 2.1649 | −0.0313 | 6.0734 | 2.1509 | −0.0357 | 6.8373 |
| 2.2875 | 0.0006 | 5.3095 | 2.2674 | −0.0058 | 6.0734 | 2.2529 | −0.0112 | 6.8373 |
| 2.3801 | 0.0252 | 5.3095 | 2.3596 | 0.0177 | 6.0734 | 2.3446 | 0.0114 | 6.8373 |
| 2.4624 | 0.0474 | 5.3095 | 2.4414 | 0.039 | 6.0734 | 2.426 | 0.032 | 6.8373 |
| 2.5398 | 0.0673 | 5.3095 | 2.5183 | 0.0581 | 6.0734 | 2.5026 | 0.0504 | 6.8373 |
| 2.607 | 0.084 | 5.3095 | 2.5851 | 0.0741 | 6.0734 | 2.569 | 0.0659 | 6.8373 |
| 2.6585 | 0.0974 | 5.3095 | 2.6364 | 0.087 | 6.0734 | 2.62 | 0.0785 | 6.8373 |
| 2.6996 | 0.1087 | 5.3095 | 2.6772 | 0.0981 | 6.0734 | 2.6605 | 0.0893 | 6.8373 |
| 2.7303 | 0.1178 | 5.3095 | 2.7076 | 0.1069 | 6.0734 | 2.6907 | 0.0981 | 6.8373 |
| 2.7526 | 0.1262 | 5.3095 | 2.7301 | 0.1146 | 6.0734 | 2.7132 | 0.1055 | 6.8373 |
| 2.7608 | 0.1365 | 5.3095 | 2.7391 | 0.1243 | 6.0734 | 2.7223 | 0.1145 | 6.8373 |
| 2.763 | 0.1448 | 5.3095 | 2.7415 | 0.1325 | 6.0734 | 2.7249 | 0.1225 | 6.8373 |
| 2.763 | 0.1491 | 5.3095 | 2.7416 | 0.1368 | 6.0734 | 2.725 | 0.1267 | 6.8373 |
| 2.7627 | 0.1512 | 5.3095 | 2.7414 | 0.1389 | 6.0734 | 2.7248 | 0.1288 | 6.8373 |
| 2.7625 | 0.1523 | 5.3095 | 2.7412 | 0.14 | 6.0734 | 2.7246 | 0.1298 | 6.8373 |
| 2.7623 | 0.1533 | 5.3095 | 2.7409 | 0.141 | 6.0734 | 2.7244 | 0.1308 | 6.8373 |
| 2.7617 | 0.1553 | 5.3095 | 2.7404 | 0.143 | 6.0734 | 2.7238 | 0.1327 | 6.8373 |
| 2.76 | 0.159 | 5.3095 | 2.7387 | 0.1467 | 6.0734 | 2.7221 | 0.1364 | 6.8373 |
| 2.7551 | 0.1656 | 5.3095 | 2.7336 | 0.1531 | 6.0734 | 2.7169 | 0.1426 | 6.8373 |
| 2.744 | 0.1719 | 5.3095 | 2.7223 | 0.1587 | 6.0734 | 2.7053 | 0.1475 | 6.8373 |
| 2.7209 | 0.171 | 5.3095 | 2.6993 | 0.1572 | 6.0734 | 2.6825 | 0.1457 | 6.8373 |
| 2.6901 | 0.1672 | 5.3095 | 2.6687 | 0.1536 | 6.0734 | 2.6521 | 0.1422 | 6.8373 |
| 2.6492 | 0.1617 | 5.3095 | 2.628 | 0.1483 | 6.0734 | 2.6116 | 0.137 | 6.8373 |
| 2.598 | 0.1544 | 5.3095 | 2.5772 | 0.1411 | 6.0734 | 2.5611 | 0.1298 | 6.8373 |
| 2.5315 | 0.1448 | 5.3095 | 2.5112 | 0.1316 | 6.0734 | 2.4955 | 0.1203 | 6.8373 |
| 2.4547 | 0.1354 | 5.3095 | 2.4349 | 0.1223 | 6.0734 | 2.4196 | 0.1108 | 6.8373 |
| 2.3725 | 0.1275 | 5.3095 | 2.3533 | 0.1145 | 6.0734 | 2.3385 | 0.1029 | 6.8373 |
| 2.28 | 0.12 | 5.3095 | 2.2614 | 0.1069 | 6.0734 | 2.2472 | 0.0952 | 6.8373 |
| 2.1771 | 0.113 | 5.3095 | 2.1591 | 0.0998 | 6.0734 | 2.1455 | 0.0878 | 6.8373 |
| 2.0637 | 0.1069 | 5.3095 | 2.0465 | 0.0937 | 6.0734 | 2.0336 | 0.0813 | 6.8373 |
| 1.9452 | 0.1023 | 5.3095 | 1.9288 | 0.0889 | 6.0734 | 1.9166 | 0.0762 | 6.8373 |
| 1.8215 | 0.0991 | 5.3095 | 1.806 | 0.0856 | 6.0734 | 1.7945 | 0.0725 | 6.8373 |
| 1.6927 | 0.0975 | 5.3095 | 1.6781 | 0.0838 | 6.0734 | 1.6674 | 0.0704 | 6.8373 |
| 1.5588 | 0.0975 | 5.3095 | 1.5452 | 0.0837 | 6.0734 | 1.5353 | 0.0698 | 6.8373 |

TABLE 1-continued

| | | | | | | | | |
|---|---|---|---|---|---|---|---|---|
| 1.4198 | 0.0992 | 5.3095 | 1.4071 | 0.0851 | 6.0734 | 1.3981 | 0.0709 | 6.8373 |
| 1.2758 | 0.1025 | 5.3095 | 1.2641 | 0.0881 | 6.0734 | 1.2559 | 0.0735 | 6.8373 |
| 1.1267 | 0.1075 | 5.3095 | 1.116 | 0.0928 | 6.0734 | 1.1086 | 0.0778 | 6.8373 |
| 0.9724 | 0.1141 | 5.3095 | 0.9628 | 0.0992 | 6.0734 | 0.9563 | 0.0838 | 6.8373 |
| 0.8183 | 0.1219 | 5.3095 | 0.8096 | 0.1067 | 6.0734 | 0.804 | 0.0911 | 6.8373 |
| 0.6641 | 0.1307 | 5.3095 | 0.6565 | 0.1154 | 6.0734 | 0.6518 | 0.0995 | 6.8373 |
| 0.51 | 0.1405 | 5.3095 | 0.5034 | 0.1251 | 6.0734 | 0.4996 | 0.1092 | 6.8373 |
| 0.3559 | 0.151 | 5.3095 | 0.3504 | 0.1357 | 6.0734 | 0.3474 | 0.1198 | 6.8373 |
| 0.2019 | 0.1617 | 5.3095 | 0.1973 | 0.1467 | 6.0734 | 0.1952 | 0.1309 | 6.8373 |
| 0.0478 | 0.1724 | 5.3095 | 0.0443 | 0.1577 | 6.0734 | 0.0431 | 0.1424 | 6.8373 |
| −0.1063 | 0.1832 | 5.3095 | −0.1087 | 0.169 | 6.0734 | −0.1091 | 0.1542 | 6.8373 |
| −0.2603 | 0.1944 | 5.3095 | −0.2617 | 0.1808 | 6.0734 | −0.2611 | 0.1666 | 6.8373 |
| −0.4143 | 0.2062 | 5.3095 | −0.4146 | 0.1933 | 6.0734 | −0.4131 | 0.1798 | 6.8373 |
| −0.5683 | 0.2187 | 5.3095 | −0.5674 | 0.2066 | 6.0734 | −0.5651 | 0.1939 | 6.8373 |
| −0.7221 | 0.232 | 5.3095 | −0.7202 | 0.2208 | 6.0734 | −0.7169 | 0.2089 | 6.8373 |
| −0.8708 | 0.2457 | 5.3095 | −0.8678 | 0.2354 | 6.0734 | −0.8635 | 0.2245 | 6.8373 |
| −1.0143 | 0.2595 | 5.3095 | −1.0103 | 0.2502 | 6.0734 | −1.0051 | 0.2404 | 6.8373 |
| −1.1526 | 0.2734 | 5.3095 | −1.1476 | 0.2651 | 6.0734 | −1.1415 | 0.2564 | 6.8373 |
| −1.2858 | 0.2871 | 5.3095 | −1.2797 | 0.2799 | 6.0734 | −1.2728 | 0.2723 | 6.8373 |
| −1.4138 | 0.3006 | 5.3095 | −1.4067 | 0.2945 | 6.0734 | −1.399 | 0.2881 | 6.8373 |
| −1.5366 | 0.3139 | 5.3095 | −1.5287 | 0.3088 | 6.0734 | −1.5201 | 0.3036 | 6.8373 |
| −1.6544 | 0.3267 | 5.3095 | −1.6455 | 0.3227 | 6.0734 | −1.6361 | 0.3188 | 6.8373 |
| −1.7619 | 0.338 | 5.3095 | −1.7522 | 0.3352 | 6.0734 | −1.742 | 0.3325 | 6.8373 |
| −1.8592 | 0.3475 | 5.3095 | −1.8488 | 0.346 | 6.0734 | −1.8379 | 0.3446 | 6.8373 |
| −1.9464 | 0.3553 | 5.3095 | −1.9352 | 0.355 | 6.0734 | −1.9238 | 0.3549 | 6.8373 |
| −2.0234 | 0.3617 | 5.3095 | −2.0116 | 0.3624 | 6.0734 | −1.9996 | 0.3635 | 6.8373 |
| −2.0901 | 0.367 | 5.3095 | −2.0778 | 0.3686 | 6.0734 | −2.0653 | 0.3706 | 6.8373 |
| −2.1466 | 0.3713 | 5.3095 | −2.1338 | 0.3738 | 6.0734 | −2.121 | 0.3766 | 6.8373 |
| −2.1949 | 0.3742 | 5.3095 | −2.1817 | 0.3776 | 6.0734 | −2.1686 | 0.3813 | 6.8373 |
| −2.2355 | 0.3748 | 5.3095 | −2.2221 | 0.3793 | 6.0734 | −2.2087 | 0.3841 | 6.8373 |
| −2.2689 | 0.3731 | 5.3095 | −2.2553 | 0.3785 | 6.0734 | −2.2417 | 0.3843 | 6.8373 |
| −2.2954 | 0.3692 | 5.3095 | −2.2817 | 0.3755 | 6.0734 | −2.268 | 0.3822 | 6.8373 |
| −2.3152 | 0.3639 | 5.3095 | −2.3016 | 0.3709 | 6.0734 | −2.288 | 0.3784 | 6.8373 |
| −2.3294 | 0.3577 | 5.3095 | −2.3159 | 0.3653 | 6.0734 | −2.3024 | 0.3735 | 6.8373 |
| −2.34 | 0.3504 | 5.3095 | −2.3267 | 0.3585 | 6.0734 | −2.3135 | 0.3672 | 6.8373 |
| −2.3467 | 0.3426 | 5.3095 | −2.3336 | 0.351 | 6.0734 | −2.3206 | 0.3599 | 6.8373 |

| Section 13 | | | Section 14 | | | Section 15 | | |
|---|---|---|---|---|---|---|---|---|
| X | Y | Z | X | Y | Z | X | Y | Z |
| −2.3057 | 0.3597 | 7.6011 | −2.2822 | 0.3628 | 8.365 | −2.2548 | 0.3631 | 9.1288 |
| −2.3066 | 0.3518 | 7.6011 | −2.283 | 0.355 | 8.365 | −2.2555 | 0.3554 | 9.1288 |
| −2.304 | 0.3416 | 7.6011 | −2.2801 | 0.3449 | 8.365 | −2.2524 | 0.3456 | 9.1288 |
| −2.2974 | 0.3302 | 7.6011 | −2.2733 | 0.3338 | 8.365 | −2.2453 | 0.3348 | 9.1288 |
| −2.2872 | 0.3182 | 7.6011 | −2.2629 | 0.3222 | 8.365 | −2.2348 | 0.3236 | 9.1288 |
| −2.2717 | 0.3043 | 7.6011 | −2.2472 | 0.3088 | 8.365 | −2.219 | 0.3106 | 9.1288 |
| −2.2495 | 0.2886 | 7.6011 | −2.225 | 0.2935 | 8.365 | −2.1968 | 0.2959 | 9.1288 |
| −2.2203 | 0.2713 | 7.6011 | −2.1959 | 0.2768 | 8.365 | −2.1678 | 0.2797 | 9.1288 |
| −2.1838 | 0.2525 | 7.6011 | −2.1595 | 0.2584 | 8.365 | −2.1319 | 0.2616 | 9.1288 |
| −2.1397 | 0.2314 | 7.6011 | −2.1158 | 0.2375 | 8.365 | −2.0887 | 0.2407 | 9.1288 |
| −2.0878 | 0.2074 | 7.6011 | −2.0644 | 0.2136 | 8.365 | −2.0379 | 0.217 | 9.1288 |
| −2.026 | 0.1798 | 7.6011 | −2.0031 | 0.1862 | 8.365 | −1.9774 | 0.1899 | 9.1288 |
| −1.9542 | 0.1494 | 7.6011 | −1.932 | 0.1561 | 8.365 | −1.9072 | 0.16 | 9.1288 |
| −1.8722 | 0.1168 | 7.6011 | −1.8508 | 0.1237 | 8.365 | −1.8269 | 0.1278 | 9.1288 |
| −1.7799 | 0.0826 | 7.6011 | −1.7593 | 0.0895 | 8.365 | −1.7365 | 0.0937 | 9.1288 |
| −1.6771 | 0.0471 | 7.6011 | −1.6574 | 0.054 | 8.365 | −1.6358 | 0.0582 | 9.1288 |
| −1.5637 | 0.0107 | 7.6011 | −1.5449 | 0.0176 | 8.365 | −1.5246 | 0.0218 | 9.1288 |
| −1.4445 | −0.0249 | 7.6011 | −1.4268 | −0.0181 | 8.365 | −1.4079 | −0.0141 | 9.1288 |
| −1.3195 | −0.0593 | 7.6011 | −1.3029 | −0.0529 | 8.365 | −1.2855 | −0.0491 | 9.1288 |
| −1.1886 | −0.0924 | 7.6011 | −1.1733 | −0.0862 | 8.365 | −1.1579 | −0.0826 | 9.1288 |
| −1.0521 | −0.1238 | 7.6011 | −1.0385 | 1−0.1178 | 8.365 | −1.025 | −0.1143 | 9.1288 |
| −0.9103 | −0.1533 | 7.6011 | −0.8984 | −0.1474 | 8.365 | −0.8869 | −0.1442 | 9.1288 |
| −0.763 | −0.1805 | 7.6011 | −0.7529 | −0.1748 | 8.365 | −0.7434 | −0.1719 | 9.1288 |
| −0.6104 | −0.2052 | 7.6011 | −0.6022 | −0.1998 | 8.365 | −0.5946 | −0.1972 | 9.1288 |
| −0.4574 | −0.2264 | 7.6011 | −0.4511 | −0.2213 | 8.365 | −0.4455 | −0.2192 | 9.1288 |
| −0.304 | −0.2439 | 7.6011 | −0.2997 | −0.2393 | 8.365 | −0.2959 | −0.2376 | 9.1288 |
| −0.1503 | −0.2577 | 7.6011 | −0.1479 | −0.2536 | 8.365 | −0.146 | −0.2525 | 9.1288 |
| 0.0038 | −0.2677 | 7.6011 | 0.0042 | −0.2642 | 8.365 | 0.0044 | −0.2637 | 9.1288 |
| 0.1583 | −0.2736 | 7.6011 | 0.1567 | −0.2708 | 8.365 | 0.1552 | −0.271 | 9.1288 |
| 0.3132 | −0.2754 | 7.6011 | 0.3096 | −0.2734 | 8.365 | 0.3065 | −0.2745 | 9.1288 |
| 0.4686 | −0.2732 | 7.6011 | 0.4628 | −0.2721 | 8.365 | 0.4582 | −0.2739 | 9.1288 |
| 0.6242 | −0.2672 | 7.6011 | 0.6164 | −0.2671 | 8.365 | 0.6103 | −0.2697 | 9.1288 |
| 0.7798 | −0.2577 | 7.6011 | 0.7703 | −0.2586 | 8.365 | 0.7628 | −0.262 | 9.1288 |
| 0.9351 | −0.2446 | 7.6011 | 0.9244 | −0.2466 | 8.365 | 0.9152 | −0.2511 | 9.1288 |
| 1.09 | −0.2281 | 7.6011 | 1.0781 | −0.2313 | 8.365 | 1.0673 | −0.2369 | 9.1288 |
| 1.2395 | −0.2092 | 7.6011 | 1.2264 | −0.2136 | 8.365 | 1.214 | −0.2203 | 9.1288 |
| 1.3836 | −0.1885 | 7.6011 | 1.3692 | −0.194 | 8.365 | 1.3553 | −0.2017 | 9.1288 |
| 1.5221 | −0.1662 | 7.6011 | 1.5067 | −0.1727 | 8.365 | 1.4914 | −0.1813 | 9.1288 |
| 1.6552 | −0.1427 | 7.6011 | 1.6387 | −0.15 | 8.365 | 1.622 | −0.1594 | 9.1288 |

TABLE 1-continued

| X | Y | Z | X | Y | Z | X | Y | Z |
|---|---|---|---|---|---|---|---|---|
| 1.7829 | −0.1183 | 7.6011 | 1.7653 | −0.1264 | 8.365 | 1.7472 | −0.1364 | 9.1288 |
| 1.9051 | −0.0934 | 7.6011 | 1.8865 | −0.1023 | 8.365 | 1.8672 | −0.1129 | 9.1288 |
| 2.022 | −0.0683 | 7.6011 | 2.0025 | −0.0778 | 8.365 | 1.9819 | −0.089 | 9.1288 |
| 2.1335 | −0.0431 | 7.6011 | 2.1131 | −0.0533 | 8.365 | 2.0914 | −0.065 | 9.1288 |
| 2.2348 | −0.0194 | 7.6011 | 2.2136 | −0.0302 | 8.365 | 2.1908 | −0.0424 | 9.1288 |
| 2.3257 | 0.0025 | 7.6011 | 2.3038 | −0.0088 | 8.365 | 2.28 | −0.0214 | 9.1288 |
| 2.4065 | 0.0225 | 7.6011 | 2.3839 | 0.0108 | 8.365 | 2.3592 | −0.0022 | 9.1288 |
| 2.4824 | 0.0404 | 7.6011 | 2.4591 | 0.0284 | 8.365 | 2.4337 | 0.0152 | 9.1288 |
| 2.5483 | 0.0555 | 7.6011 | 2.5245 | 0.0432 | 8.365 | 2.4982 | 0.0298 | 9.1288 |
| 2.5988 | 0.0678 | 7.6011 | 2.5745 | 0.0553 | 8.365 | 2.5478 | 0.0418 | 9.1288 |
| 2.639 | 0.0785 | 7.6011 | 2.6144 | 0.0659 | 8.365 | 2.5871 | 0.0523 | 9.1288 |
| 2.6689 | 0.0871 | 7.6011 | 2.6441 | 0.0745 | 8.365 | 2.6165 | 0.0608 | 9.1288 |
| 2.6912 | 0.0942 | 7.6011 | 2.6662 | 0.0814 | 8.365 | 2.6384 | 0.0675 | 9.1288 |
| 2.701 | 0.1026 | 7.6011 | 2.6761 | 0.0894 | 8.365 | 2.6486 | 0.0749 | 9.1288 |
| 2.7039 | 0.1105 | 7.6011 | 2.679 | 0.0971 | 8.365 | 2.6518 | 0.0825 | 9.1288 |
| 2.7041 | 0.1147 | 7.6011 | 2.6793 | 0.1012 | 8.365 | 2.6521 | 0.0866 | 9.1288 |
| 2.7039 | 0.1169 | 7.6011 | 2.6791 | 0.1033 | 8.365 | 2.6519 | 0.0887 | 9.1288 |
| 2.7037 | 0.1179 | 7.6011 | 2.6789 | 0.1043 | 8.365 | 2.6517 | 0.0897 | 9.1288 |
| 2.7035 | 0.1189 | 7.6011 | 2.6786 | 0.1053 | 8.365 | 2.6514 | 0.0907 | 9.1288 |
| 2.7029 | 0.1208 | 7.6011 | 2.678 | 0.1072 | 8.365 | 2.6508 | 0.0926 | 9.1288 |
| 2.7012 | 0.1245 | 7.6011 | 2.6763 | 0.1108 | 8.365 | 2.6491 | 0.0961 | 9.1288 |
| 2.6958 | 0.1305 | 7.6011 | 2.6708 | 0.1166 | 8.365 | 2.6435 | 0.1017 | 9.1288 |
| 2.6841 | 0.1348 | 7.6011 | 2.6591 | 0.1202 | 8.365 | 2.6317 | 0.1048 | 9.1288 |
| 2.6615 | 0.1327 | 7.6011 | 2.6366 | 0.118 | 8.365 | 2.6095 | 0.1023 | 9.1288 |
| 2.6313 | 0.1292 | 7.6011 | 2.6068 | 0.1144 | 8.365 | 2.58 | 0.0986 | 9.1288 |
| 2.5911 | 0.124 | 7.6011 | 2.567 | 0.1091 | 8.365 | 2.5407 | 0.0931 | 9.1288 |
| 2.5411 | 0.1168 | 7.6011 | 2.5174 | 0.1017 | 8.365 | 2.4917 | 0.0855 | 9.1288 |
| 2.476 | 0.1071 | 7.6011 | 2.453 | 0.0919 | 8.365 | 2.428 | 0.0754 | 9.1288 |
| 2.4007 | 0.0975 | 7.6011 | 2.3785 | 0.082 | 8.365 | 2.3544 | 0.0652 | 9.1288 |
| 2.3203 | 0.0893 | 7.6011 | 2.2988 | 0.0734 | 8.365 | 2.2756 | 0.0562 | 9.1288 |
| 2.2296 | 0.0812 | 7.6011 | 2.2091 | 0.0649 | 8.365 | 2.1868 | 0.0472 | 9.1288 |
| 2.1288 | 0.0735 | 7.6011 | 2.1092 | 0.0567 | 8.365 | 2.088 | 0.0383 | 9.1288 |
| 2.0177 | 0.0665 | 7.6011 | 1.9993 | 0.0491 | 8.365 | 1.9793 | 0.0301 | 9.1288 |
| 1.9017 | 0.0609 | 7.6011 | 1.8843 | 0.0429 | 8.365 | 1.8657 | 0.0232 | 9.1288 |
| 1.7806 | 0.0567 | 7.6011 | 1.7644 | 0.038 | 8.365 | 1.7471 | 0.0176 | 9.1288 |
| 1.6545 | 0.0541 | 7.6011 | 1.6395 | 0.0348 | 8.365 | 1.6235 | 0.0135 | 9.1288 |
| 1.5234 | 0.0531 | 7.6011 | 1.5097 | 0.0331 | 8.365 | 1.4951 | 0.0111 | 9.1288 |
| 1.3873 | 0.0536 | 7.6011 | 1.3748 | 0.0329 | 8.365 | 1.3617 | 0.0102 | 9.1288 |
| 1.2461 | 0.0557 | 7.6011 | 1.235 | 0.0345 | 8.365 | 1.2233 | 0.0112 | 9.1288 |
| 1.1 | 0.0596 | 7.6011 | 1.0902 | 0.0379 | 8.365 | 1.0801 | 0.014 | 9.1288 |
| 0.9488 | 0.0652 | 7.6011 | 0.9405 | 0.0431 | 8.365 | 0.9319 | 0.0188 | 9.1288 |
| 0.7977 | 0.0722 | 7.6011 | 0.7907 | 0.0499 | 8.365 | 0.7837 | 0.0252 | 9.1288 |
| 0.6466 | 0.0805 | 7.6011 | 0.641 | 0.0579 | 8.365 | 0.6355 | 0.0331 | 9.1288 |
| 0.4955 | 0.0901 | 7.6011 | 0.4913 | 0.0674 | 8.365 | 0.4873 | 0.0423 | 9.1288 |
| 0.3444 | 0.1007 | 7.6011 | 0.3416 | 0.0779 | 8.365 | 0.3391 | 0.0527 | 9.1288 |
| 0.1934 | 0.112 | 7.6011 | 0.1919 | 0.0892 | 8.365 | 0.1911 | 0.064 | 9.1288 |
| 0.0424 | 0.1238 | 7.6011 | 0.0424 | 0.1013 | 8.365 | 0.0431 | 0.0763 | 9.1288 |
| −0.1086 | 0.1361 | 7.6011 | −0.1071 | 0.1141 | 8.365 | −0.1048 | 0.0895 | 9.1288 |
| −0.2595 | 0.1491 | 7.6011 | −0.2566 | 0.1277 | 8.365 | −0.2526 | 0.1037 | 9.1288 |
| −0.4103 | 0.1631 | 7.6011 | −0.4059 | 0.1424 | 8.365 | −0.4002 | 0.119 | 9.1288 |
| −0.561 | 0.178 | 7.6011 | −0.5551 | 0.1581 | 8.365 | −0.5478 | 0.1356 | 9.1288 |
| −0.7116 | 0.1939 | 7.6011 | −0.7042 | 0.175 | 8.365 | −0.6952 | 0.1534 | 9.1288 |
| −0.857 | 0.2105 | 7.6011 | −0.8482 | 0.1925 | 8.365 | −0.8376 | 0.1719 | 9.1288 |
| −0.9974 | 0.2274 | 7.6011 | −0.9872 | 0.2105 | 8.365 | −0.9749 | 0.1909 | 9.1288 |
| −1.1327 | 0.2445 | 7.6011 | −1.121 | 0.2287 | 8.365 | −1.1072 | 0.2102 | 9.1288 |
| −1.2628 | 0.2617 | 7.6011 | −1.2498 | 0.2471 | 8.365 | −1.2344 | 0.2298 | 9.1288 |
| −1.3879 | 0.2787 | 7.6011 | −1.3735 | 0.2654 | 8.365 | −1.3567 | 0.2495 | 9.1288 |
| −1.508 | 0.2955 | 7.6011 | −1.4922 | 0.2836 | 8.365 | −1.4739 | 0.269 | 9.1288 |
| −1.6229 | 0.312 | 7.6011 | −1.6059 | 0.3016 | 8.365 | −1.5861 | 0.2884 | 9.1288 |
| −1.7279 | 0.3272 | 7.6011 | −1.7097 | 0.3181 | 8.365 | −1.6886 | 0.3062 | 9.1288 |
| −1.8229 | 0.3406 | 7.6011 | −1.8036 | 0.3328 | 8.365 | −1.7813 | 0.3222 | 9.1288 |
| −1.908 | 0.3521 | 7.6011 | −1.8877 | 0.3456 | 8.365 | −1.8643 | 0.3363 | 9.1288 |
| −1.9831 | 0.3619 | 7.6011 | −1.962 | 0.3566 | 8.365 | −1.9376 | 0.3484 | 9.1288 |
| −2.0482 | 0.37 | 7.6011 | −2.0264 | 0.3658 | 8.365 | −2.0011 | 0.3587 | 9.1288 |
| −2.1033 | 0.3768 | 7.6011 | −2.0809 | 0.3734 | 8.365 | −2.0549 | 0.3672 | 9.1288 |
| −2.1505 | 0.3824 | 7.6011 | −2.1275 | 0.3798 | 8.365 | −2.1009 | 0.3744 | 9.1288 |
| −2.1902 | 0.3862 | 7.6011 | −2.1667 | 0.3846 | 8.365 | −2.1396 | 0.38 | 9.1288 |
| −2.223 | 0.3875 | 7.6011 | −2.1991 | 0.3869 | 8.365 | −2.1716 | 0.3834 | 9.1288 |
| −2.2492 | 0.3863 | 7.6011 | −2.2251 | 0.3867 | 8.365 | −2.1973 | 0.3842 | 9.1288 |
| −2.2691 | 0.3833 | 7.6011 | −2.245 | 0.3845 | 8.365 | −2.2171 | 0.3829 | 9.1288 |
| −2.2836 | 0.379 | 7.6011 | −2.2596 | 0.3809 | 8.365 | −2.2316 | 0.38 | 9.1288 |
| −2.2949 | 0.3733 | 7.6011 | −2.271 | 0.3758 | 8.365 | −2.2431 | 0.3755 | 9.1288 |
| −2.3023 | 0.3664 | 7.6011 | −2.2786 | 0.3694 | 8.365 | −2.251 | 0.3695 | 9.1288 |

| Section 16 | | | Section 17 | | | Section 18 | | |
|---|---|---|---|---|---|---|---|---|
| X | Y | Z | X | Y | Z | X | Y | Z |
| −2.2258 | 0.3628 | 9.8926 | −2.1976 | 0.3649 | 10.6565 | −2.1727 | 0.3735 | 11.4203 |
| −2.2264 | 0.3551 | 9.8926 | −2.1982 | 0.3574 | 10.6565 | −2.1732 | 0.3661 | 11.4203 |

TABLE 1-continued

| | | | | | | | | |
|---|---|---|---|---|---|---|---|---|
| −2.2231 | 0.3455 | 9.8926 | −2.1946 | 0.348 | 10.6565 | −2.1695 | 0.3569 | 11.4203 |
| −2.2158 | 0.335 | 9.8926 | −2.1872 | 0.3378 | 10.6565 | −2.162 | 0.347 | 11.4203 |
| −2.2052 | 0.3242 | 9.8926 | −2.1765 | 0.3274 | 10.6565 | −2.1512 | 0.3369 | 11.4203 |
| −2.1893 | 0.3117 | 9.8926 | −2.1606 | 0.3153 | 10.6565 | −2.1352 | 0.3252 | 11.4203 |
| −2.1671 | 0.2975 | 9.8926 | −2.1385 | 0.3016 | 10.6565 | −2.1133 | 0.312 | 11.4203 |
| −2.1384 | 0.2818 | 9.8926 | −2.11 | 0.2864 | 10.6565 | −2.0851 | 0.2971 | 11.4203 |
| −2.1029 | 0.264 | 9.8926 | −2.0749 | 0.2687 | 10.6565 | −2.0505 | 0.2795 | 11.4203 |
| −2.0603 | 0.2433 | 9.8926 | −2.0329 | 0.2482 | 10.6565 | −2.009 | 0.259 | 11.4203 |
| −2.0101 | 0.2197 | 9.8926 | −1.9835 | 0.2248 | 10.6565 | −1.9603 | 0.2357 | 11.4203 |
| −1.9504 | 0.1929 | 9.8926 | −1.9247 | 0.1981 | 10.6565 | −1.9023 | 0.2089 | 11.4203 |
| −1.8811 | 0.1632 | 9.8926 | −1.8563 | 0.1686 | 10.6565 | −1.8349 | 0.1793 | 11.4203 |
| −1.8019 | 0.1313 | 9.8926 | −1.7781 | 0.1368 | 10.6565 | −1.7578 | 0.1473 | 11.4203 |
| −1.7127 | 0.0972 | 9.8926 | −1.6901 | 0.1027 | 10.6565 | −1.6711 | 0.1129 | 11.4203 |
| −1.6133 | 0.0617 | 9.8926 | −1.5921 | 0.0671 | 10.6565 | −1.5744 | 0.0768 | 11.4203 |
| −1.5034 | 0.0253 | 9.8926 | −1.4837 | 0.0307 | 10.6565 | −1.4678 | 0.0401 | 11.4203 |
| −1.3881 | −0.0106 | 9.8926 | −1.3702 | −0.0051 | 10.6565 | −1.3561 | 0.0041 | 11.4203 |
| −1.2676 | −0.0455 | 9.8926 | −1.2515 | −0.0398 | 10.6565 | −1.2392 | −0.0307 | 11.4203 |
| −1.1419 | −0.0789 | 9.8926 | −1.1276 | −0.0731 | 10.6565 | −1.1172 | −0.0642 | 11.4203 |
| −1.011 | −0.1108 | 9.8926 | −0.9986 | −0.1052 | 10.6565 | −0.9901 | −0.0968 | 11.4203 |
| −0.8748 | −0.1409 | 9.8926 | −0.8645 | −0.1357 | 10.6565 | −0.8578 | −0.1282 | 11.4203 |
| −0.7334 | −0.169 | 9.8926 | −0.7251 | −0.1643 | 10.6565 | −0.7202 | −0.1576 | 11.4203 |
| −0.5867 | −0.1947 | 9.8926 | −0.5803 | −0.1905 | 10.6565 | −0.5772 | −0.1848 | 11.4203 |
| −0.4395 | −0.217 | 9.8926 | −0.4351 | −0.2134 | 10.6565 | −0.4337 | −0.2086 | 11.4203 |
| −0.2918 | −0.236 | 9.8926 | −0.2894 | −0.2329 | 10.6565 | −0.2894 | −0.229 | 11.4203 |
| −0.1438 | −0.2514 | 9.8926 | −0.1431 | −0.249 | 10.6565 | −0.1446 | −0.2459 | 11.4203 |
| 0.0048 | −0.2632 | 9.8926 | 0.0037 | −0.2614 | 10.6565 | 0.001 | −0.2593 | 11.4203 |
| 0.1539 | −0.2712 | 9.8926 | 0.1511 | −0.2701 | 10.6565 | 0.1472 | −0.2689 | 11.4203 |
| 0.3034 | −0.2753 | 9.8926 | 0.299 | −0.275 | 10.6565 | 0.2941 | −0.2748 | 11.4203 |
| 0.4535 | −0.2756 | 9.8926 | 0.4475 | −0.2761 | 10.6565 | 0.4415 | −0.2769 | 11.4203 |
| 0.604 | −0.2721 | 9.8926 | 0.5965 | −0.2736 | 10.6565 | 0.5888 | −0.2754 | 11.4203 |
| 0.7549 | −0.2653 | 9.8926 | 0.7457 | −0.2677 | 10.6565 | 0.7359 | −0.2706 | 11.4203 |
| 0.9056 | −0.2554 | 9.8926 | 0.8946 | −0.2587 | 10.6565 | 0.883 | −0.2627 | 11.4203 |
| 1.0559 | −0.2423 | 9.8926 | 1.0432 | −0.2466 | 10.6565 | 1.0299 | −0.2516 | 11.4203 |
| 1.201 | −0.2267 | 9.8926 | 1.1867 | −0.232 | 10.6565 | 1.1717 | −0.238 | 11.4203 |
| 1.3409 | −0.209 | 9.8926 | 1.3251 | −0.2152 | 10.6565 | 1.3083 | −0.2223 | 11.4203 |
| 1.4754 | −0.1895 | 9.8926 | 1.4581 | −0.1966 | 10.6565 | 1.4398 | −0.2046 | 11.4203 |
| 1.6046 | −0.1684 | 9.8926 | 1.5859 | −0.1764 | 10.6565 | 1.5661 | −0.1854 | 11.4203 |
| 1.7285 | −0.1462 | 9.8926 | 1.7085 | −0.1551 | 10.6565 | 1.6872 | −0.1651 | 11.4203 |
| 1.8472 | −0.1233 | 9.8926 | 1.8259 | −0.1331 | 10.6565 | 1.8032 | −0.144 | 11.4203 |
| 1.9606 | −0.1001 | 9.8926 | 1.9381 | −0.1106 | 10.6565 | 1.9142 | −0.1223 | 11.4203 |
| 2.0689 | −0.0767 | 9.8926 | 2.0452 | −0.0879 | 10.6565 | 2.02 | −0.1003 | 11.4203 |
| 2.1672 | −0.0546 | 9.8926 | 2.1424 | −0.0664 | 10.6565 | 2.116 | −0.0794 | 11.4203 |
| 2.2554 | −0.034 | 9.8926 | 2.2297 | −0.0462 | 10.6565 | 2.2023 | −0.0598 | 11.4203 |
| 2.3338 | −0.0151 | 9.8926 | 2.3071 | −0.0277 | 10.6565 | 2.2788 | −0.0416 | 11.4203 |
| 2.4073 | 0.0021 | 9.8926 | 2.3798 | −0.0108 | 10.6565 | 2.3506 | −0.0249 | 11.4203 |
| 2.4711 | 0.0166 | 9.8926 | 2.4429 | 0.0036 | 10.6565 | 2.4128 | −0.0106 | 11.4203 |
| 2.5201 | 0.0285 | 9.8926 | 2.4912 | 0.0155 | 10.6565 | 2.4605 | 0.0012 | 11.4203 |
| 2.559 | 0.0389 | 9.8926 | 2.5297 | 0.0258 | 10.6565 | 2.4985 | 0.0115 | 11.4203 |
| 2.588 | 0.0473 | 9.8926 | 2.5584 | 0.0341 | 10.6565 | 2.5268 | 0.0198 | 11.4203 |
| 2.6097 | 0.054 | 9.8926 | 2.5798 | 0.0408 | 10.6565 | 2.5479 | 0.0264 | 11.4203 |
| 2.62 | 0.061 | 9.8926 | 2.59 | 0.0475 | 10.6565 | 2.5577 | 0.0331 | 11.4203 |
| 2.6232 | 0.0684 | 9.8926 | 2.5932 | 0.0548 | 10.6565 | 2.5607 | 0.0402 | 11.4203 |
| 2.6234 | 0.0725 | 9.8926 | 2.5935 | 0.0588 | 10.6565 | 2.561 | 0.0441 | 11.4203 |
| 2.6232 | 0.0745 | 9.8926 | 2.5933 | 0.0608 | 10.6565 | 2.5608 | 0.046 | 11.4203 |
| 2.6231 | 0.0755 | 9.8926 | 2.5931 | 0.0618 | 10.6565 | 2.5606 | 0.047 | 11.4203 |
| 2.6228 | 0.0765 | 9.8926 | 2.5928 | 0.0628 | 10.6565 | 2.5603 | 0.0479 | 11.4203 |
| 2.6222 | 0.0783 | 9.8926 | 2.5922 | 0.0646 | 10.6565 | 2.5597 | 0.0497 | 11.4203 |
| 2.6204 | 0.0818 | 9.8926 | 2.5904 | 0.068 | 10.6565 | 2.5578 | 0.0531 | 11.4203 |
| 2.6148 | 0.0872 | 9.8926 | 2.5847 | 0.0732 | 10.6565 | 2.5521 | 0.0582 | 11.4203 |
| 2.603 | 0.0898 | 9.8926 | 2.573 | 0.0754 | 10.6565 | 2.5405 | 0.0601 | 11.4203 |
| 2.5811 | 0.0871 | 9.8926 | 2.5513 | 0.0726 | 10.6565 | 2.5191 | 0.0571 | 11.4203 |
| 2.5519 | 0.0832 | 9.8926 | 2.5225 | 0.0685 | 10.6565 | 2.4907 | 0.0529 | 11.4203 |
| 2.5131 | 0.0775 | 9.8926 | 2.4842 | 0.0625 | 10.6565 | 2.4528 | 0.0467 | 11.4203 |
| 2.4647 | 0.0697 | 9.8926 | 2.4364 | 0.0545 | 10.6565 | 2.4055 | 0.0385 | 11.4203 |
| 2.4018 | 0.0593 | 9.8926 | 2.3742 | 0.0439 | 10.6565 | 2.3441 | 0.0276 | 11.4203 |
| 2.329 | 0.0488 | 9.8926 | 2.3023 | 0.033 | 10.6565 | 2.2731 | 0.0163 | 11.4203 |
| 2.2511 | 0.0394 | 9.8926 | 2.2254 | 0.0232 | 10.6565 | 2.197 | 0.006 | 11.4203 |
| 2.1634 | 0.0298 | 9.8926 | 2.1387 | 0.0131 | 10.6565 | 2.1113 | −0.0044 | 11.4203 |
| 2.0658 | 0.0204 | 9.8926 | 2.0423 | 0.0032 | 10.6565 | 2.016 | −0.0149 | 11.4203 |
| 1.9584 | 0.0115 | 9.8926 | 1.9361 | −0.0062 | 10.6565 | 1.911 | −0.0248 | 11.4203 |
| 1.846 | 0.0039 | 9.8926 | 1.8251 | −0.0144 | 10.6565 | 1.8013 | −0.0335 | 11.4203 |
| 1.7288 | −0.0024 | 9.8926 | 1.7092 | −0.0213 | 10.6565 | 1.6867 | −0.0408 | 11.4203 |
| 1.6067 | −0.0072 | 9.8926 | 1.5885 | −0.0266 | 10.6565 | 1.5674 | −0.0467 | 11.4203 |
| 1.4797 | −0.0103 | 9.8926 | 1.463 | −0.0304 | 10.6565 | 1.4432 | −0.051 | 11.4203 |
| 1.3478 | −0.0118 | 9.8926 | 1.3326 | −0.0325 | 10.6565 | 1.3142 | −0.0536 | 11.4203 |
| 1.211 | −0.0115 | 9.8926 | 1.1973 | −0.0328 | 10.6565 | 1.1805 | −0.0543 | 11.4203 |
| 1.0694 | −0.0092 | 9.8926 | 1.0572 | −0.0311 | 10.6565 | 1.0419 | −0.0531 | 11.4203 |
| 0.9228 | −0.0049 | 9.8926 | 0.9123 | −0.0273 | 10.6565 | 0.8985 | −0.0498 | 11.4203 |
| 0.7762 | 0.001 | 9.8926 | 0.7673 | −0.0218 | 10.6565 | 0.7551 | −0.0446 | 11.4203 |
| 0.6296 | 0.0086 | 9.8926 | 0.6223 | −0.0145 | 10.6565 | 0.6117 | −0.0375 | 11.4203 |

TABLE 1-continued

| X | Y | Z | X | Y | Z | X | Y | Z |
|---|---|---|---|---|---|---|---|---|
| 0.483 | 0.0177 | 9.8926 | 0.4773 | −0.0057 | 10.6565 | 0.4682 | −0.0287 | 11.4203 |
| 0.3365 | 0.0279 | 9.8926 | 0.3325 | 0.0045 | 10.6565 | 0.3249 | −0.0183 | 11.4203 |
| 0.1901 | 0.0392 | 9.8926 | 0.1877 | 0.0159 | 10.6565 | 0.1818 | −0.0065 | 11.4203 |
| 0.0438 | 0.0516 | 9.8926 | 0.0431 | 0.0286 | 10.6565 | 0.0389 | 0.0068 | 11.4203 |
| −0.1023 | 0.0652 | 9.8926 | −0.1013 | 0.0426 | 10.6565 | −0.1039 | 0.0214 | 11.4203 |
| −0.2484 | 0.0799 | 9.8926 | −0.2457 | 0.0579 | 10.6565 | −0.2466 | 0.0376 | 11.4203 |
| −0.3943 | 0.0959 | 9.8926 | −0.3899 | 0.0746 | 10.6565 | −0.389 | 0.0553 | 11.4203 |
| −0.5401 | 0.1133 | 9.8926 | −0.5339 | 0.0929 | 10.6565 | −0.5313 | 0.0747 | 11.4203 |
| −0.6858 | 0.1321 | 9.8926 | −0.6777 | 0.1127 | 10.6565 | −0.6734 | 0.096 | 11.4203 |
| −0.8264 | 0.1516 | 9.8926 | −0.8166 | 0.1334 | 10.6565 | −0.8105 | 0.1182 | 11.4203 |
| −0.9621 | 0.1716 | 9.8926 | −0.9505 | 0.1547 | 10.6565 | −0.9427 | 0.141 | 11.4203 |
| −1.0927 | 0.1921 | 9.8926 | −1.0795 | 0.1763 | 10.6565 | −1.07 | 0.1641 | 11.4203 |
| −1.2183 | 0.2128 | 9.8926 | −1.2035 | 0.1982 | 10.6565 | −1.1923 | 0.1875 | 11.4203 |
| −1.339 | 0.2336 | 9.8926 | −1.3225 | 0.2202 | 10.6565 | −1.3098 | 0.2109 | 11.4203 |
| −1.4547 | 0.2543 | 9.8926 | −1.4367 | 0.2419 | 10.6565 | −1.4225 | 0.234 | 11.4203 |
| −1.5654 | 0.2748 | 9.8926 | −1.546 | 0.2634 | 10.6565 | −1.5303 | 0.2568 | 11.4203 |
| −1.6665 | 0.2939 | 9.8926 | −1.6457 | 0.2837 | 10.6565 | −1.6285 | 0.2785 | 11.4203 |
| −1.7579 | 0.3111 | 9.8926 | −1.7358 | 0.3023 | 10.6565 | −1.7173 | 0.2987 | 11.4203 |
| −1.8398 | 0.3264 | 9.8926 | −1.8165 | 0.3189 | 10.6565 | −1.7967 | 0.3169 | 11.4203 |
| −1.912 | 0.3398 | 9.8926 | −1.8876 | 0.3335 | 10.6565 | −1.8668 | 0.3329 | 11.4203 |
| −1.9747 | 0.3511 | 9.8926 | −1.9493 | 0.346 | 10.6565 | −1.9275 | 0.3467 | 11.4203 |
| −2.0277 | 0.3605 | 9.8926 | −2.0016 | 0.3563 | 10.6565 | −1.9789 | 0.3582 | 11.4203 |
| −2.0731 | 0.3685 | 9.8926 | −2.0463 | 0.3651 | 10.6565 | −2.0229 | 0.368 | 11.4203 |
| −2.1112 | 0.3749 | 9.8926 | −2.0838 | 0.3724 | 10.6565 | −2.0599 | 0.3761 | 11.4203 |
| −2.1427 | 0.3793 | 9.8926 | −2.1149 | 0.3777 | 10.6565 | −2.0904 | 0.3824 | 11.4203 |
| −2.1681 | 0.381 | 9.8926 | −2.1399 | 0.3804 | 10.6565 | −2.115 | 0.3861 | 11.4203 |
| −2.1877 | 0.3805 | 9.8926 | −2.1592 | 0.3807 | 10.6565 | −2.1341 | 0.3873 | 11.4203 |
| −2.2022 | 0.3783 | 9.8926 | −2.1737 | 0.3792 | 10.6565 | −2.1485 | 0.3864 | 11.4203 |
| −2.2138 | 0.3745 | 9.8926 | −2.1853 | 0.3759 | 10.6565 | −2.1601 | 0.3838 | 11.4203 |
| −2.2219 | 0.369 | 9.8926 | −2.1935 | 0.3709 | 10.6565 | −2.1685 | 0.3793 | 11.4203 |

| Section 19 | | | Section 20 | | | Section 21 | | |
|---|---|---|---|---|---|---|---|---|
| X | Y | Z | X | Y | Z | X | Y | Z |
| −2.1512 | 0.3896 | 12.1842 | −2.1283 | 0.4078 | 12.9481 | −2.0976 | 0.4166 | 13.7119 |
| −2.1516 | 0.3823 | 12.1842 | −2.1286 | 0.4005 | 12.9481 | −2.0979 | 0.4095 | 13.7119 |
| −2.1476 | 0.3732 | 12.1842 | −2.1245 | 0.3917 | 12.9481 | −2.0936 | 0.4009 | 13.7119 |
| −2.1399 | 0.3636 | 12.1842 | −2.1168 | 0.3824 | 12.9481 | −2.0858 | 0.3919 | 13.7119 |
| −2.129 | 0.3538 | 12.1842 | −2.1058 | 0.3728 | 12.9481 | −2.0748 | 0.3827 | 13.7119 |
| −2.113 | 0.3424 | 12.1842 | −2.0899 | 0.3618 | 12.9481 | −2.0591 | 0.3721 | 13.7119 |
| −2.0912 | 0.3295 | 12.1842 | −2.0683 | 0.3493 | 12.9481 | −2.0376 | 0.3598 | 13.7119 |
| −2.0631 | 0.3146 | 12.1842 | −2.0407 | 0.3345 | 12.9481 | −2.0105 | 0.3452 | 13.7119 |
| −2.0288 | 0.297 | 12.1842 | −2.007 | 0.3168 | 12.9481 | −1.9774 | 0.3274 | 13.7119 |
| −1.9878 | 0.2763 | 12.1842 | −1.9667 | 0.296 | 12.9481 | −1.938 | 0.3065 | 13.7119 |
| −1.9396 | 0.2527 | 12.1842 | −1.9194 | 0.2721 | 12.9481 | −1.8917 | 0.2824 | 13.7119 |
| −1.8823 | 0.2255 | 12.1842 | −1.8632 | 0.2445 | 12.9481 | −1.8367 | 0.2545 | 13.7119 |
| −1.8156 | 0.1954 | 12.1842 | −1.7978 | 0.2138 | 12.9481 | −1.7726 | 0.2233 | 13.7119 |
| −1.7393 | 0.1627 | 12.1842 | −1.723 | 0.1804 | 12.9481 | −1.6994 | 0.1894 | 13.7119 |
| −1.6535 | 0.1274 | 12.1842 | −1.639 | 0.1443 | 12.9481 | −1.6171 | 0.1526 | 13.7119 |
| −1.558 | 0.0905 | 12.1842 | −1.5455 | 0.1064 | 12.9481 | −1.5256 | 0.1138 | 13.7119 |
| −1.4528 | 0.0529 | 12.1842 | −1.4422 | 0.0677 | 12.9481 | −1.4244 | 0.0742 | 13.7119 |
| −1.3424 | 0.016 | 12.1842 | −1.3339 | 0.0296 | 12.9481 | −1.3181 | 0.0349 | 13.7119 |
| −1.2268 | −0.0196 | 12.1842 | −1.2202 | −0.0074 | 12.9481 | −1.2066 | −0.0035 | 13.7119 |
| −1.1059 | −0.0539 | 12.1842 | −1.1012 | −0.0431 | 12.9481 | −1.0896 | −0.0407 | 13.7119 |
| −0.9799 | −0.0877 | 12.1842 | −0.9771 | −0.0782 | 12.9481 | −0.9674 | −0.077 | 13.7119 |
| −0.8486 | −0.1203 | 12.1842 | −0.8476 | −0.1122 | 12.9481 | −0.8398 | −0.112 | 13.7119 |
| −0.712 | −0.1511 | 12.1842 | −0.7127 | −0.1444 | 12.9481 | −0.7066 | −0.1453 | 13.7119 |
| −0.5699 | −0.1796 | 12.1842 | −0.5722 | −0.1744 | 12.9481 | −0.5678 | −0.1764 | 13.7119 |
| −0.4269 | −0.2047 | 12.1842 | −0.4306 | −0.201 | 12.9481 | −0.4287 | −0.2039 | 13.7119 |
| −0.2831 | −0.2262 | 12.1842 | −0.2882 | −0.224 | 12.9481 | −0.2893 | −0.2278 | 13.7119 |
| −0.1384 | −0.2443 | 12.1842 | −0.1458 | −0.2433 | 12.9481 | −0.1498 | −0.2481 | 13.7119 |
| 0.007 | −0.2587 | 12.1842 | −0.0033 | −0.259 | 12.9481 | −0.01 | −0.2647 | 13.7119 |
| 0.1523 | −0.2693 | 12.1842 | 0.1391 | −0.2709 | 12.9481 | 0.1299 | −0.2777 | 13.7119 |
| 0.2974 | −0.2761 | 12.1842 | 0.2815 | −0.2792 | 12.9481 | 0.27 | −0.2871 | 13.7119 |
| 0.4422 | −0.2792 | 12.1842 | 0.4239 | −0.2838 | 12.9481 | 0.4102 | −0.2928 | 13.7119 |
| 0.5867 | −0.2789 | 12.1842 | 0.5662 | −0.2849 | 12.9481 | 0.5507 | −0.295 | 13.7119 |
| 0.731 | −0.2752 | 12.1842 | 0.7085 | −0.2827 | 12.9481 | 0.6913 | −0.2938 | 13.7119 |
| 0.875 | −0.2683 | 12.1842 | 0.8508 | −0.2772 | 12.9481 | 0.8321 | −0.2894 | 13.7119 |
| 1.0187 | −0.2584 | 12.1842 | 0.9931 | −0.2686 | 12.9481 | 0.973 | −0.2816 | 13.7119 |
| 1.1575 | −0.246 | 12.1842 | 1.1305 | −0.2573 | 12.9481 | 1.1094 | −0.271 | 13.7119 |
| 1.2913 | −0.2313 | 12.1842 | 1.2633 | −0.2437 | 12.9481 | 1.2413 | −0.258 | 13.7119 |
| 1.4201 | −0.2148 | 12.1842 | 1.3912 | −0.2281 | 12.9481 | 1.3683 | −0.2429 | 13.7119 |
| 1.544 | −0.1968 | 12.1842 | 1.5144 | −0.2108 | 12.9481 | 1.4903 | −0.226 | 13.7119 |
| 1.663 | −0.1776 | 12.1842 | 1.6329 | −0.1922 | 12.9481 | 1.6073 | −0.2077 | 13.7119 |
| 1.777 | −0.1574 | 12.1842 | 1.7464 | −0.1726 | 12.9481 | 1.7193 | −0.1882 | 13.7119 |
| 1.8862 | −0.1366 | 12.1842 | 1.8548 | −0.1521 | 12.9481 | 1.8263 | −0.1677 | 13.7119 |
| 1.9906 | −0.1153 | 12.1842 | 1.9583 | −0.1311 | 12.9481 | 1.9284 | −0.1467 | 13.7119 |
| 2.0854 | −0.0949 | 12.1842 | 2.0522 | −0.111 | 12.9481 | 2.021 | −0.1265 | 13.7119 |
| 2.1706 | −0.0757 | 12.1842 | 2.1364 | −0.0919 | 12.9481 | 2.1041 | −0.1073 | 13.7119 |

TABLE 1-continued

| | | | | | | | | |
|---|---|---|---|---|---|---|---|---|
| 2.2462 | −0.0578 | 12.1842 | 2.2111 | −0.0742 | 12.9481 | 2.1778 | −0.0895 | 13.7119 |
| 2.3171 | −0.0414 | 12.1842 | 2.2812 | −0.0578 | 12.9481 | 2.2469 | −0.073 | 13.7119 |
| 2.3786 | −0.0272 | 12.1842 | 2.342 | −0.0436 | 12.9481 | 2.3069 | −0.0588 | 13.7119 |
| 2.4257 | −0.0154 | 12.1842 | 2.3885 | −0.0319 | 12.9481 | 2.3527 | −0.047 | 13.7119 |
| 2.4632 | −0.0051 | 12.1842 | 2.4255 | −0.0216 | 12.9481 | 2.3892 | −0.0367 | 13.7119 |
| 2.4911 | 0.0032 | 12.1842 | 2.4531 | −0.0133 | 12.9481 | 2.4164 | −0.0283 | 13.7119 |
| 2.5119 | 0.0098 | 12.1842 | 2.4737 | −0.0066 | 12.9481 | 2.4366 | −0.0216 | 13.7119 |
| 2.5218 | 0.0164 | 12.1842 | 2.4835 | 0 | 12.9481 | 2.4462 | −0.0149 | 13.7119 |
| 2.5248 | 0.0235 | 12.1842 | 2.4864 | 0.0071 | 12.9481 | 2.449 | −0.0078 | 13.7119 |
| 2.525 | 0.0274 | 12.1842 | 2.4866 | 0.011 | 12.9481 | 2.4492 | −0.004 | 13.7119 |
| 2.5248 | 0.0293 | 12.1842 | 2.4864 | 0.0129 | 12.9481 | 2.449 | −0.0021 | 13.7119 |
| 2.5246 | 0.0303 | 12.1842 | 2.4862 | 0.0139 | 12.9481 | 2.4488 | −0.0011 | 13.7119 |
| 2.5244 | 0.0312 | 12.1842 | 2.486 | 0.0148 | 12.9481 | 2.4485 | −0.0002 | 13.7119 |
| 2.5237 | 0.033 | 12.1842 | 2.4853 | 0.0165 | 12.9481 | 2.4479 | 0.0015 | 13.7119 |
| 2.5219 | 0.0363 | 12.1842 | 2.4835 | 0.0198 | 12.9481 | 2.4461 | 0.0048 | 13.7119 |
| 2.5162 | 0.0414 | 12.1842 | 2.4779 | 0.0248 | 12.9481 | 2.4405 | 0.0097 | 13.7119 |
| 2.5047 | 0.0431 | 12.1842 | 2.4665 | 0.0266 | 12.9481 | 2.4293 | 0.0116 | 13.7119 |
| 2.4836 | 0.0401 | 12.1842 | 2.4456 | 0.0235 | 12.9481 | 2.4087 | 0.0085 | 13.7119 |
| 2.4554 | 0.0357 | 12.1842 | 2.4178 | 0.0191 | 12.9481 | 2.3812 | 0.0039 | 13.7119 |
| 2.418 | 0.0294 | 12.1842 | 2.3808 | 0.0126 | 12.9481 | 2.3447 | −0.0028 | 13.7119 |
| 2.3712 | 0.0209 | 12.1842 | 2.3346 | 0.0038 | 12.9481 | 2.2992 | −0.0117 | 13.7119 |
| 2.3106 | 0.0097 | 12.1842 | 2.2747 | −0.0077 | 12.9481 | 2.2401 | −0.0237 | 13.7119 |
| 2.2403 | −0.002 | 12.1842 | 2.2053 | −0.0199 | 12.9481 | 2.1717 | −0.0364 | 13.7119 |
| 2.1652 | −0.0127 | 12.1842 | 2.131 | −0.0311 | 12.9481 | 2.0985 | −0.0483 | 13.7119 |
| 2.0804 | −0.0237 | 12.1842 | 2.0473 | −0.0426 | 12.9481 | 2.016 | −0.0607 | 13.7119 |
| 1.9861 | −0.0346 | 12.1842 | 1.9541 | −0.0543 | 12.9481 | 1.924 | −0.0733 | 13.7119 |
| 1.8823 | −0.045 | 12.1842 | 1.8515 | −0.0654 | 12.9481 | 1.8229 | −0.0854 | 13.7119 |
| 1.7738 | −0.0542 | 12.1842 | 1.7443 | −0.0753 | 12.9481 | 1.717 | −0.0963 | 13.7119 |
| 1.6605 | −0.0621 | 12.1842 | 1.6323 | −0.0839 | 12.9481 | 1.6066 | −0.1058 | 13.7119 |
| 1.5424 | −0.0685 | 12.1842 | 1.5156 | −0.0908 | 12.9481 | 1.4914 | −0.1136 | 13.7119 |
| 1.4196 | −0.0732 | 12.1842 | 1.3942 | −0.0961 | 12.9481 | 1.3717 | −0.1196 | 13.7119 |
| 1.292 | −0.0761 | 12.1842 | 1.2681 | −0.0994 | 12.9481 | 1.2472 | −0.1237 | 13.7119 |
| 1.1597 | −0.0772 | 12.1842 | 1.1373 | −0.1008 | 12.9481 | 1.1181 | −0.1257 | 13.7119 |
| 1.0226 | −0.0763 | 12.1842 | 1.0017 | −0.1002 | 12.9481 | 0.9844 | −0.1255 | 13.7119 |
| 0.8808 | −0.0732 | 12.1842 | 0.8615 | −0.0973 | 12.9481 | 0.846 | −0.1229 | 13.7119 |
| 0.7389 | −0.0681 | 12.1842 | 0.7212 | −0.0921 | 12.9481 | 0.7075 | −0.1179 | 13.7119 |
| 0.5969 | −0.0609 | 12.1842 | 0.5809 | −0.0848 | 12.9481 | 0.5689 | −0.1106 | 13.7119 |
| 0.455 | −0.0518 | 12.1842 | 0.4405 | −0.0753 | 12.9481 | 0.4304 | −0.1009 | 13.7119 |
| 0.3133 | −0.041 | 12.1842 | 0.3004 | −0.0638 | 12.9481 | 0.292 | −0.0891 | 13.7119 |
| 0.1717 | −0.0284 | 12.1842 | 0.1605 | −0.0504 | 12.9481 | 0.1539 | −0.0753 | 13.7119 |
| 0.0304 | −0.0143 | 12.1842 | 0.0208 | −0.0354 | 12.9481 | 0.0161 | −0.0596 | 13.7119 |
| −0.1108 | 0.0014 | 12.1842 | −0.1186 | −0.0186 | 12.9481 | −0.1214 | −0.042 | 13.7119 |
| −0.2517 | 0.0187 | 12.1842 | −0.2578 | 0 | 12.9481 | −0.2587 | −0.0224 | 13.7119 |
| −0.3925 | 0.0378 | 12.1842 | −0.3967 | 0.0206 | 12.9481 | −0.3956 | −0.0007 | 13.7119 |
| −0.533 | 0.0588 | 12.1842 | −0.5354 | 0.0433 | 12.9481 | −0.5322 | 0.0232 | 13.7119 |
| −0.6732 | 0.0818 | 12.1842 | −0.6737 | 0.068 | 12.9481 | −0.6685 | 0.0493 | 13.7119 |
| −0.8086 | 0.1059 | 12.1842 | −0.8072 | 0.094 | 12.9481 | −0.8 | 0.0766 | 13.7119 |
| −0.9391 | 0.1306 | 12.1842 | −0.9358 | 0.1206 | 12.9481 | −0.9266 | 0.1048 | 13.7119 |
| −1.0646 | 0.1555 | 12.1842 | −1.0596 | 0.1475 | 12.9481 | −1.0484 | 0.1334 | 13.7119 |
| −1.1853 | 0.1808 | 12.1842 | −1.1784 | 0.1748 | 12.9481 | −1.1652 | 0.1624 | 13.7119 |
| −1.3011 | 0.206 | 12.1842 | −1.2924 | 0.2021 | 12.9481 | −1.2772 | 0.1917 | 13.7119 |
| −1.4121 | 0.2309 | 12.1842 | −1.4016 | 0.2293 | 12.9481 | −1.3844 | 0.2211 | 13.7119 |
| −1.5184 | 0.2556 | 12.1842 | −1.5061 | 0.2563 | 12.9481 | −1.4869 | 0.2502 | 13.7119 |
| −1.6151 | 0.2793 | 12.1842 | −1.6011 | 0.2822 | 12.9481 | −1.5801 | 0.2781 | 13.7119 |
| −1.7025 | 0.3014 | 12.1842 | −1.6869 | 0.3063 | 12.9481 | −1.6643 | 0.3039 | 13.7119 |
| −1.7806 | 0.3214 | 12.1842 | −1.7636 | 0.3281 | 12.9481 | −1.7395 | 0.3271 | 13.7119 |
| −1.8495 | 0.339 | 12.1842 | −1.8313 | 0.3473 | 12.9481 | −1.8059 | 0.3476 | 13.7119 |
| −1.9092 | 0.3542 | 12.1842 | −1.89 | 0.3639 | 12.9481 | −1.8635 | 0.3653 | 13.7119 |
| −1.9598 | 0.367 | 12.1842 | −1.9397 | 0.3779 | 12.9481 | −1.9122 | 0.3802 | 13.7119 |
| −2.003 | 0.3779 | 12.1842 | −1.9821 | 0.3899 | 12.9481 | −1.9538 | 0.3931 | 13.7119 |
| −2.0393 | 0.387 | 12.1842 | −2.0177 | 0.4 | 12.9481 | −1.9888 | 0.404 | 13.7119 |
| −2.0693 | 0.3943 | 12.1842 | −2.0471 | 0.4083 | 12.9481 | −2.0175 | 0.413 | 13.7119 |
| −2.0935 | 0.3991 | 12.1842 | −2.0708 | 0.414 | 12.9481 | −2.0406 | 0.4197 | 13.7119 |
| −2.1123 | 0.4012 | 12.1842 | −2.0893 | 0.417 | 12.9481 | −2.0587 | 0.4236 | 13.7119 |
| −2.1265 | 0.4011 | 12.1842 | −2.1033 | 0.4177 | 12.9481 | −2.0725 | 0.425 | 13.7119 |
| −2.1382 | 0.3991 | 12.1842 | −2.115 | 0.4164 | 12.9481 | −2.0841 | 0.4244 | 13.7119 |
| −2.1467 | 0.3951 | 12.1842 | −2.1237 | 0.413 | 12.9481 | −2.0929 | 0.4216 | 13.7119 |

| Section 22 | | | Section 23 | | | Section 24 | | |
|---|---|---|---|---|---|---|---|---|
| −2.0652 | 0.4291 | 14.4758 | −2.049 | 0.4333 | 14.825 | −2.045 | 0.4332 | 14.9 |
| −2.0654 | 0.4221 | 14.4758 | −2.0491 | 0.4263 | 14.825 | −2.0451 | 0.4262 | 14.9 |
| −2.0609 | 0.4138 | 14.4758 | −2.0446 | 0.4181 | 14.825 | −2.0406 | 0.4181 | 14.9 |
| −2.053 | 0.4051 | 14.4758 | −2.0366 | 0.4096 | 14.825 | −2.0326 | 0.4096 | 14.9 |
| −2.0421 | 0.3962 | 14.4758 | −2.0257 | 0.4008 | 14.825 | −2.0217 | 0.4009 | 14.9 |
| −2.0264 | 0.386 | 14.4758 | −2.0101 | 0.3908 | 14.825 | −2.0061 | 0.3909 | 14.9 |
| −2.0053 | 0.374 | 14.4758 | −1.9891 | 0.3788 | 14.825 | −1.9852 | 0.3789 | 14.9 |
| −1.9787 | 0.3593 | 14.4758 | −1.9628 | 0.364 | 14.825 | −1.9589 | 0.3641 | 14.9 |
| −1.9464 | 0.3414 | 14.4758 | −1.9308 | 0.3461 | 14.825 | −1.927 | 0.3461 | 14.9 |
| −1.9078 | 0.3203 | 14.4758 | −1.8927 | 0.3249 | 14.825 | −1.889 | 0.3249 | 14.9 |

TABLE 1-continued

| | | | | | | | | |
|---|---|---|---|---|---|---|---|---|
| −1.8626 | 0.2958 | 14.4758 | −1.8479 | 0.3003 | 14.825 | −1.8443 | 0.3003 | 14.9 |
| −1.8088 | 0.2675 | 14.4758 | −1.7946 | 0.2719 | 14.825 | −1.7911 | 0.2719 | 14.9 |
| −1.7461 | 0.236 | 14.4758 | −1.7325 | 0.2403 | 14.825 | −1.7292 | 0.2403 | 14.9 |
| −1.6745 | 0.2016 | 14.4758 | −1.6617 | 0.2058 | 14.825 | −1.6584 | 0.2058 | 14.9 |
| −1.5941 | 0.1642 | 14.4758 | −1.5821 | 0.1683 | 14.825 | −1.579 | 0.1684 | 14.9 |
| −1.5046 | 0.1247 | 14.4758 | −1.4934 | 0.1287 | 14.825 | −1.4904 | 0.1287 | 14.9 |
| −1.4054 | 0.0843 | 14.4758 | −1.3951 | 0.0881 | 14.825 | −1.3923 | 0.0881 | 14.9 |
| −1.3013 | 0.0439 | 14.4758 | −1.2919 | 0.0473 | 14.825 | −1.2893 | 0.0473 | 14.9 |
| −1.1919 | 0.0042 | 14.4758 | −1.1834 | 0.0072 | 14.825 | −1.181 | 0.0072 | 14.9 |
| −1.0771 | −0.0344 | 14.4758 | −1.0695 | −0.0316 | 14.825 | −1.0673 | −0.0317 | 14.9 |
| −0.9569 | −0.0718 | 14.4758 | −0.9501 | −0.0694 | 14.825 | −0.9481 | −0.0694 | 14.9 |
| −0.8311 | −0.1078 | 14.4758 | −0.8255 | −0.1056 | 14.825 | −0.8237 | −0.1057 | 14.9 |
| −0.7002 | −0.142 | 14.4758 | −0.696 | −0.1399 | 14.825 | −0.6945 | −0.14 | 14.9 |
| −0.5645 | −0.1738 | 14.4758 | −0.5616 | −0.1719 | 14.825 | −0.5604 | −0.172 | 14.9 |
| −0.4284 | −0.2021 | 14.4758 | −0.4268 | −0.2005 | 14.825 | −0.4258 | −0.2005 | 14.9 |
| −0.2919 | −0.2269 | 14.4758 | −0.2915 | −0.2254 | 14.825 | −0.2908 | −0.2255 | 14.9 |
| −0.155 | −0.2481 | 14.4758 | −0.1558 | −0.2469 | 14.825 | −0.1553 | −0.2469 | 14.9 |
| −0.0178 | −0.2656 | 14.4758 | −0.0197 | −0.2647 | 14.825 | −0.0194 | −0.2648 | 14.9 |
| 0.1197 | −0.2796 | 14.4758 | 0.1169 | −0.279 | 14.825 | 0.1169 | −0.2791 | 14.9 |
| 0.2577 | −0.2899 | 14.4758 | 0.2539 | −0.2896 | 14.825 | 0.2537 | −0.2897 | 14.9 |
| 0.396 | −0.2966 | 14.4758 | 0.3913 | −0.2966 | 14.825 | 0.391 | −0.2968 | 14.9 |
| 0.5347 | −0.2998 | 14.4758 | 0.5292 | −0.3001 | 14.825 | 0.5287 | −0.3003 | 14.9 |
| 0.6738 | −0.2996 | 14.4758 | 0.6675 | −0.3002 | 14.825 | 0.6668 | −0.3004 | 14.9 |
| 0.8131 | −0.2959 | 14.4758 | 0.8062 | −0.2968 | 14.825 | 0.8054 | −0.2971 | 14.9 |
| 0.9529 | −0.2889 | 14.4758 | 0.9452 | −0.2901 | 14.825 | 0.9442 | −0.2904 | 14.9 |
| 1.088 | −0.2789 | 14.4758 | 1.0793 | −0.2804 | 14.825 | 1.0781 | −0.2808 | 14.9 |
| 1.2181 | −0.2664 | 14.4758 | 1.2085 | −0.2682 | 14.825 | 1.2071 | −0.2686 | 14.9 |
| 1.3433 | −0.2518 | 14.4758 | 1.3329 | −0.2537 | 14.825 | 1.3313 | −0.2542 | 14.9 |
| 1.4637 | −0.2352 | 14.4758 | 1.4524 | −0.2374 | 14.825 | 1.4507 | −0.2378 | 14.9 |
| 1.579 | −0.2171 | 14.4758 | 1.567 | −0.2194 | 14.825 | 1.5651 | −0.2199 | 14.9 |
| 1.6894 | −0.1977 | 14.4758 | 1.6767 | −0.2001 | 14.825 | 1.6745 | −0.2006 | 14.9 |
| 1.7949 | −0.1773 | 14.4758 | 1.7814 | −0.1797 | 14.825 | 1.7791 | −0.1802 | 14.9 |
| 1.8955 | −0.1561 | 14.4758 | 1.8813 | −0.1586 | 14.825 | 1.8789 | −0.1591 | 14.9 |
| 1.9868 | −0.1358 | 14.4758 | 1.9719 | −0.1383 | 14.825 | 1.9693 | −0.1388 | 14.9 |
| 2.0686 | −0.1165 | 14.4758 | 2.0531 | −0.119 | 14.825 | 2.0504 | −0.1196 | 14.9 |
| 2.1412 | −0.0986 | 14.4758 | 2.1252 | −0.1012 | 14.825 | 2.1224 | −0.1017 | 14.9 |
| 2.2093 | −0.0821 | 14.4758 | 2.1928 | −0.0846 | 14.825 | 2.1899 | −0.0852 | 14.9 |
| 2.2683 | −0.0677 | 14.4758 | 2.2514 | −0.0703 | 14.825 | 2.2484 | −0.0709 | 14.9 |
| 2.3135 | −0.0559 | 14.4758 | 2.2963 | −0.0584 | 14.825 | 2.2932 | −0.059 | 14.9 |
| 2.3494 | −0.0454 | 14.4758 | 2.3319 | −0.048 | 14.825 | 2.3287 | −0.0486 | 14.9 |
| 2.3761 | −0.037 | 14.4758 | 2.3584 | −0.0395 | 14.825 | 2.3552 | −0.04 | 14.9 |
| 2.3961 | −0.0302 | 14.4758 | 2.3781 | −0.0327 | 14.825 | 2.3749 | −0.0332 | 14.9 |
| 2.405 | −0.0232 | 14.4758 | 2.3871 | −0.0257 | 14.825 | 2.3839 | −0.0263 | 14.9 |
| 2.4075 | −0.0163 | 14.4758 | 2.3897 | −0.0188 | 14.825 | 2.3864 | −0.0194 | 14.9 |
| 2.4076 | −0.0127 | 14.4758 | 2.3898 | −0.0151 | 14.825 | 2.3865 | −0.0157 | 14.9 |
| 2.4074 | −0.0108 | 14.4758 | 2.3895 | −0.0133 | 14.825 | 2.3863 | −0.0138 | 14.9 |
| 2.4071 | −0.0099 | 14.4758 | 2.3893 | −0.0123 | 14.825 | 2.3861 | −0.0129 | 14.9 |
| 2.4069 | −0.009 | 14.4758 | 2.3891 | −0.0115 | 14.825 | 2.3858 | −0.012 | 14.9 |
| 2.4063 | −0.0073 | 14.4758 | 2.3884 | −0.0098 | 14.825 | 2.3852 | −0.0103 | 14.9 |
| 2.4045 | −0.0041 | 14.4758 | 2.3866 | −0.0066 | 14.825 | 2.3834 | −0.0072 | 14.9 |
| 2.399 | 0.0007 | 14.4758 | 2.3813 | −0.0017 | 14.825 | 2.378 | −0.0023 | 14.9 |
| 2.388 | 0.0028 | 14.4758 | 2.3703 | 0.0003 | 14.825 | 2.3671 | −0.0002 | 14.9 |
| 2.3676 | −0.0004 | 14.4758 | 2.3501 | −0.0029 | 14.825 | 2.3469 | −0.0034 | 14.9 |
| 2.3406 | −0.0051 | 14.4758 | 2.3232 | −0.0075 | 14.825 | 2.3201 | −0.0081 | 14.9 |
| 2.3046 | −0.0119 | 14.4758 | 2.2875 | −0.0144 | 14.825 | 2.2844 | −0.015 | 14.9 |
| 2.2598 | −0.0211 | 14.4758 | 2.243 | −0.0237 | 14.825 | 2.24 | −0.0243 | 14.9 |
| 2.2017 | −0.0335 | 14.4758 | 2.1853 | −0.0362 | 14.825 | 2.1823 | −0.0369 | 14.9 |
| 2.1343 | −0.0467 | 14.4758 | 2.1185 | −0.0497 | 14.825 | 2.1156 | −0.0503 | 14.9 |
| 2.0622 | −0.0592 | 14.4758 | 2.0469 | −0.0624 | 14.825 | 2.0442 | −0.0631 | 14.9 |
| 1.981 | −0.0724 | 14.4758 | 1.9662 | −0.0759 | 14.825 | 1.9636 | −0.0766 | 14.9 |
| 1.8905 | −0.0858 | 14.4758 | 1.8764 | −0.0896 | 14.825 | 1.8739 | −0.0905 | 14.9 |
| 1.7908 | −0.0989 | 14.4758 | 1.7774 | −0.1031 | 14.825 | 1.7751 | −0.104 | 14.9 |
| 1.6866 | −0.1107 | 14.4758 | 1.6739 | −0.1152 | 14.825 | 1.6718 | −0.1162 | 14.9 |
| 1.5777 | −0.1211 | 14.4758 | 1.5658 | −0.1259 | 14.825 | 1.5639 | −0.127 | 14.9 |
| 1.4643 | −0.1297 | 14.4758 | 1.4532 | −0.1349 | 14.825 | 1.4514 | −0.136 | 14.9 |
| 1.3463 | −0.1364 | 14.4758 | 1.3361 | −0.1419 | 14.825 | 1.3344 | −0.1432 | 14.9 |
| 1.2237 | −0.1412 | 14.4758 | 1.2143 | −0.147 | 14.825 | 1.2129 | −0.1482 | 14.9 |
| 1.0965 | −0.1437 | 14.4758 | 1.088 | −0.1498 | 14.825 | 1.0867 | −0.1511 | 14.9 |
| 0.9647 | −0.1439 | 14.4758 | 0.9571 | −0.1502 | 14.825 | 0.956 | −0.1516 | 14.9 |
| 0.8283 | −0.1416 | 14.4758 | 0.8216 | −0.148 | 14.825 | 0.8208 | −0.1495 | 14.9 |
| 0.6918 | −0.1368 | 14.4758 | 0.6861 | −0.1433 | 14.825 | 0.6854 | −0.1448 | 14.9 |
| 0.5553 | −0.1295 | 14.4758 | 0.5505 | −0.1361 | 14.825 | 0.55 | −0.1377 | 14.9 |
| 0.4187 | −0.1198 | 14.4758 | 0.4148 | −0.1264 | 14.825 | 0.4145 | −0.128 | 14.9 |
| 0.2822 | −0.1077 | 14.4758 | 0.2792 | −0.1144 | 14.825 | 0.2792 | −0.116 | 14.9 |
| 0.1461 | −0.0935 | 14.4758 | 0.144 | −0.1001 | 14.825 | 0.1442 | −0.1017 | 14.9 |
| 0.0103 | −0.0772 | 14.4758 | 0.0092 | −0.0837 | 14.825 | 0.0095 | −0.0853 | 14.9 |
| −0.1251 | −0.0588 | 14.4758 | −0.1253 | −0.0651 | 14.825 | −0.1248 | −0.0667 | 14.9 |
| −0.2603 | −0.0383 | 14.4758 | −0.2595 | −0.0443 | 14.825 | −0.2587 | −0.0459 | 14.9 |
| −0.3951 | −0.0156 | 14.4758 | −0.3933 | −0.0212 | 14.825 | −0.3923 | −0.0228 | 14.9 |
| −0.5295 | 0.0094 | 14.4758 | −0.5267 | 0.0041 | 14.825 | −0.5256 | 0.0025 | 14.9 |

TABLE 1-continued

| | | | | | | | | |
|---|---|---|---|---|---|---|---|---|
| −0.6636 | 0.0367 | 14.4758 | −0.6598 | 0.0317 | 14.825 | −0.6584 | 0.0302 | 14.9 |
| −0.7929 | 0.0653 | 14.4758 | −0.7881 | 0.0607 | 14.825 | −0.7865 | 0.0592 | 14.9 |
| −0.9173 | 0.0948 | 14.4758 | −0.9116 | 0.0906 | 14.825 | −0.9098 | 0.0892 | 14.9 |
| −1.0369 | 0.125 | 14.4758 | −1.0302 | 0.1213 | 14.825 | −1.0282 | 0.1199 | 14.9 |
| −1.1516 | 0.1555 | 14.4758 | −1.1439 | 0.1524 | 14.825 | −1.1417 | 0.1511 | 14.9 |
| −1.2615 | 0.1866 | 14.4758 | −1.2528 | 0.1841 | 14.825 | −1.2504 | 0.1829 | 14.9 |
| −1.3665 | 0.2179 | 14.4758 | −1.3569 | 0.216 | 14.825 | −1.3543 | 0.2149 | 14.9 |
| −1.4669 | 0.2489 | 14.4758 | −1.4564 | 0.2476 | 14.825 | −1.4536 | 0.2465 | 14.9 |
| −1.5582 | 0.2785 | 14.4758 | −1.5468 | 0.2777 | 14.825 | −1.5439 | 0.2767 | 14.9 |
| −1.6406 | 0.3058 | 14.4758 | −1.6284 | 0.3055 | 14.825 | −1.6253 | 0.3046 | 14.9 |
| −1.7143 | 0.3303 | 14.4758 | −1.7014 | 0.3305 | 14.825 | −1.6982 | 0.3297 | 14.9 |
| −1.7793 | 0.3519 | 14.4758 | −1.7658 | 0.3526 | 14.825 | −1.7625 | 0.3519 | 14.9 |
| −1.8357 | 0.3706 | 14.4758 | −1.8217 | 0.3717 | 14.825 | −1.8182 | 0.371 | 14.9 |
| −1.8834 | 0.3864 | 14.4758 | −1.8689 | 0.3879 | 14.825 | −1.8653 | 0.3873 | 14.9 |
| −1.9241 | 0.4001 | 14.4758 | −1.9092 | 0.4018 | 14.825 | −1.9055 | 0.4013 | 14.9 |
| −1.9583 | 0.4117 | 14.4758 | −1.943 | 0.4137 | 14.825 | −1.9393 | 0.4132 | 14.9 |
| −1.9864 | 0.4214 | 14.4758 | −1.9708 | 0.4237 | 14.825 | −1.967 | 0.4232 | 14.9 |
| −2.0089 | 0.4289 | 14.4758 | −1.993 | 0.4315 | 14.825 | −1.9892 | 0.4311 | 14.9 |
| −2.0265 | 0.4337 | 14.4758 | −2.0104 | 0.4367 | 14.825 | −2.0065 | 0.4364 | 14.9 |
| −2.04 | 0.4358 | 14.4758 | −2.0238 | 0.4392 | 14.825 | −2.0199 | 0.4389 | 14.9 |
| −2.0514 | 0.4359 | 14.4758 | −2.0351 | 0.4396 | 14.825 | −2.0312 | 0.4394 | 14.9 |
| −2.0603 | 0.4337 | 14.4758 | −2.044 | 0.4377 | 14.825 | −2.04 | 0.4376 | 14.9 |
| Section 25 | | | Section 26 | | | Section 27 | | |
| −2.0337 | 0.4306 | 15.096 | −2.0245 | 0.4265 | 15.2396 | −2.0144 | 0.4215 | 15.392 |
| −2.0338 | 0.4237 | 15.096 | −2.0245 | 0.4196 | 15.2396 | −2.0144 | 0.4147 | 15.392 |
| −2.0292 | 0.4156 | 15.096 | −2.0198 | 0.4116 | 15.2396 | −2.0097 | 0.4067 | 15.392 |
| −2.0212 | 0.4072 | 15.096 | −2.0118 | 0.4032 | 15.2396 | −2.0017 | 0.3985 | 15.392 |
| −2.0103 | 0.3986 | 15.096 | −2.0009 | 0.3947 | 15.2396 | −1.9907 | 0.3901 | 15.392 |
| −1.9947 | 0.3887 | 15.096 | −1.9854 | 0.3849 | 15.2396 | −1.9752 | 0.3804 | 15.392 |
| −1.9739 | 0.3768 | 15.096 | −1.9646 | 0.3731 | 15.2396 | −1.9545 | 0.3686 | 15.392 |
| −1.9478 | 0.362 | 15.096 | −1.9386 | 0.3583 | 15.2396 | −1.9286 | 0.3538 | 15.392 |
| −1.916 | 0.344 | 15.096 | −1.907 | 0.3403 | 15.2396 | −1.8971 | 0.3359 | 15.392 |
| −1.8782 | 0.3228 | 15.096 | −1.8693 | 0.3191 | 15.2396 | −1.8596 | 0.3147 | 15.392 |
| −1.8337 | 0.2981 | 15.096 | −1.825 | 0.2945 | 15.2396 | −1.8155 | 0.2902 | 15.392 |
| −1.7808 | 0.2698 | 15.096 | −1.7723 | 0.2662 | 15.2396 | −1.763 | 0.262 | 15.392 |
| −1.7192 | 0.2383 | 15.096 | −1.7109 | 0.2349 | 15.2396 | −1.7018 | 0.2308 | 15.392 |
| −1.6488 | 0.2039 | 15.096 | −1.6408 | 0.2006 | 15.2396 | −1.6319 | 0.1967 | 15.392 |
| −1.5697 | 0.1665 | 15.096 | −1.562 | 0.1634 | 15.2396 | −1.5534 | 0.1596 | 15.392 |
| −1.4816 | 0.1269 | 15.096 | −1.4742 | 0.1239 | 15.2396 | −1.4659 | 0.1203 | 15.392 |
| −1.3839 | 0.0863 | 15.096 | −1.3768 | 0.0834 | 15.2396 | −1.3689 | 0.08 | 15.392 |
| −1.2814 | 0.0456 | 15.096 | −1.2746 | 0.0429 | 15.2396 | −1.267 | 0.0396 | 15.392 |
| −1.1736 | 0.0056 | 15.096 | −1.1671 | 0.0029 | 15.2396 | −1.1599 | −0.0002 | 15.392 |
| −1.0603 | −0.0333 | 15.096 | −1.0542 | −0.0358 | 15.2396 | −1.0473 | −0.0388 | 15.392 |
| −0.9416 | −0.071 | 15.096 | −0.9359 | −0.0734 | 15.2396 | −0.9295 | −0.0761 | 15.392 |
| −0.8179 | −0.1071 | 15.096 | −0.8128 | −0.1093 | 15.2396 | −0.8069 | −0.1119 | 15.392 |
| −0.6894 | −0.1413 | 15.096 | −0.6847 | −0.1433 | 15.2396 | −0.6794 | −0.1456 | 15.392 |
| −0.5559 | −0.1732 | 15.096 | −0.5517 | −0.175 | 15.2396 | −0.5469 | −0.1771 | 15.392 |
| −0.422 | −0.2016 | 15.096 | −0.4183 | −0.2033 | 15.2396 | −0.4139 | −0.2052 | 15.392 |
| −0.2876 | −0.2265 | 15.096 | −0.2843 | −0.228 | 15.2396 | −0.2803 | −0.2299 | 15.392 |
| −0.1527 | −0.2479 | 15.096 | −0.1498 | −0.2493 | 15.2396 | −0.1461 | −0.251 | 15.392 |
| −0.0174 | −0.2658 | 15.096 | −0.0148 | −0.2671 | 15.2396 | −0.0114 | −0.2687 | 15.392 |
| 0.1185 | −0.28 | 15.096 | 0.1208 | −0.2813 | 15.2396 | 0.1238 | −0.2828 | 15.392 |
| 0.2548 | −0.2907 | 15.096 | 0.2569 | −0.2919 | 15.2396 | 0.2597 | −0.2933 | 15.392 |
| 0.3916 | −0.2978 | 15.096 | 0.3935 | −0.2989 | 15.2396 | 0.3961 | −0.3002 | 15.392 |
| 0.5289 | −0.3013 | 15.096 | 0.5306 | −0.3025 | 15.2396 | 0.5331 | −0.3037 | 15.392 |
| 0.6667 | −0.3015 | 15.096 | 0.6682 | −0.3025 | 15.2396 | 0.6705 | −0.3038 | 15.392 |
| 0.8049 | −0.2982 | 15.096 | 0.8061 | −0.2992 | 15.2396 | 0.8078 | −0.3004 | 15.392 |
| 0.9431 | −0.2915 | 15.096 | 0.9437 | −0.2925 | 15.2396 | 0.9449 | −0.2937 | 15.392 |
| 1.0764 | −0.2819 | 15.096 | 1.0766 | −0.283 | 15.2396 | 1.0773 | −0.2841 | 15.392 |
| 1.205 | −0.2698 | 15.096 | 1.2047 | −0.2709 | 15.2396 | 1.205 | −0.2721 | 15.392 |
| 1.3287 | −0.2555 | 15.096 | 1.328 | −0.2566 | 15.2396 | 1.3279 | −0.2578 | 15.392 |
| 1.4475 | −0.2392 | 15.096 | 1.4464 | −0.2403 | 15.2396 | 1.4458 | −0.2416 | 15.392 |
| 1.5614 | −0.2213 | 15.096 | 1.56 | −0.2225 | 15.2396 | 1.5589 | −0.2237 | 15.392 |
| 1.6704 | −0.202 | 15.096 | 1.6686 | −0.2032 | 15.2396 | 1.6672 | −0.2045 | 15.392 |
| 1.7746 | −0.1817 | 15.096 | 1.7724 | −0.1829 | 15.2396 | 1.7706 | −0.1842 | 15.392 |
| 1.8739 | −0.1607 | 15.096 | 1.8714 | −0.1619 | 15.2396 | 1.8692 | −0.1633 | 15.392 |
| 1.9639 | −0.1404 | 15.096 | 1.9611 | −0.1417 | 15.2396 | 1.9586 | −0.1431 | 15.392 |
| 2.0447 | −0.1212 | 15.096 | 2.0416 | −0.1225 | 15.2396 | 2.0388 | −0.1239 | 15.392 |
| 2.1164 | −0.1033 | 15.096 | 2.113 | −0.1047 | 15.2396 | 2.1099 | −0.1061 | 15.392 |
| 2.1836 | −0.0868 | 15.096 | 2.18 | −0.0882 | 15.2396 | 2.1767 | −0.0897 | 15.392 |
| 2.2419 | −0.0725 | 15.096 | 2.2381 | −0.0739 | 15.2396 | 2.2345 | −0.0754 | 15.392 |
| 2.2864 | −0.0607 | 15.096 | 2.2825 | −0.0621 | 15.2396 | 2.2788 | −0.0636 | 15.392 |
| 2.3219 | −0.0502 | 15.096 | 2.3178 | −0.0517 | 15.2396 | 2.3139 | −0.0532 | 15.392 |
| 2.3482 | −0.0417 | 15.096 | 2.344 | −0.0432 | 15.2396 | 2.3401 | −0.0447 | 15.392 |
| 2.3678 | −0.0349 | 15.096 | 2.3636 | −0.0364 | 15.2396 | 2.3595 | −0.0379 | 15.392 |
| 2.3767 | −0.0279 | 15.096 | 2.3726 | −0.0294 | 15.2396 | 2.3685 | −0.0309 | 15.392 |
| 2.3793 | −0.021 | 15.096 | 2.3751 | −0.0225 | 15.2396 | 2.371 | −0.0239 | 15.392 |
| 2.3793 | −0.0173 | 15.096 | 2.3752 | −0.0187 | 15.2396 | 2.3711 | −0.0202 | 15.392 |

TABLE 1-continued

| | | | | | | | | |
|---|---|---|---|---|---|---|---|---|
| 2.3791 | −0.0155 | 15.096 | 2.375 | −0.0169 | 15.2396 | 2.3708 | −0.0184 | 15.392 |
| 2.3789 | −0.0145 | 15.096 | 2.3748 | −0.016 | 15.2396 | 2.3706 | −0.0175 | 15.392 |
| 2.3786 | −0.0137 | 15.096 | 2.3745 | −0.0151 | 15.2396 | 2.3704 | −0.0166 | 15.392 |
| 2.378 | −0.012 | 15.096 | 2.3739 | −0.0134 | 15.2396 | 2.3697 | −0.0149 | 15.392 |
| 2.3762 | −0.0088 | 15.096 | 2.3721 | −0.0102 | 15.2396 | 2.368 | −0.0118 | 15.392 |
| 2.3709 | −0.004 | 15.096 | 2.3668 | −0.0054 | 15.2396 | 2.3627 | −0.007 | 15.392 |
| 2.36 | −0.0019 | 15.096 | 2.3559 | −0.0033 | 15.2396 | 2.3519 | −0.0048 | 15.392 |
| 2.3399 | −0.0051 | 15.096 | 2.3359 | −0.0065 | 15.2396 | 2.3319 | −0.008 | 15.392 |
| 2.3132 | −0.0097 | 15.096 | 2.3093 | −0.0111 | 15.2396 | 2.3053 | −0.0127 | 15.392 |
| 2.2777 | −0.0167 | 15.096 | 2.2739 | −0.0181 | 15.2396 | 2.2701 | −0.0196 | 15.392 |
| 2.2334 | −0.026 | 15.096 | 2.2298 | −0.0275 | 15.2396 | 2.2261 | −0.029 | 15.392 |
| 2.176 | −0.0386 | 15.096 | 2.1725 | −0.0401 | 15.2396 | 2.1691 | −0.0417 | 15.392 |
| 2.1096 | −0.0522 | 15.096 | 2.1063 | −0.0538 | 15.2396 | 2.1031 | −0.0554 | 15.392 |
| 2.0384 | −0.0651 | 15.096 | 2.0354 | −0.0668 | 15.2396 | 2.0324 | −0.0685 | 15.392 |
| 1.9582 | −0.0788 | 15.096 | 1.9554 | −0.0805 | 15.2396 | 1.9527 | −0.0824 | 15.392 |
| 1.8689 | −0.0928 | 15.096 | 1.8664 | −0.0947 | 15.2396 | 1.8639 | −0.0967 | 15.392 |
| 1.7705 | −0.1065 | 15.096 | 1.7683 | −0.1085 | 15.2396 | 1.7662 | −0.1107 | 15.392 |
| 1.6676 | −0.1189 | 15.096 | 1.6657 | −0.1211 | 15.2396 | 1.6639 | −0.1234 | 15.392 |
| 1.5601 | −0.1299 | 15.096 | 1.5585 | −0.1323 | 15.2396 | 1.5571 | −0.1348 | 15.392 |
| 1.4481 | −0.1392 | 15.096 | 1.4469 | −0.1417 | 15.2396 | 1.4458 | −0.1444 | 15.392 |
| 1.3316 | −0.1465 | 15.096 | 1.3307 | −0.1492 | 15.2396 | 1.33 | −0.1521 | 15.392 |
| 1.2105 | −0.1518 | 15.096 | 1.21 | −0.1547 | 15.2396 | 1.2097 | −0.1577 | 15.392 |
| 1.0849 | −0.1549 | 15.096 | 1.0847 | −0.1579 | 15.2396 | 1.0848 | −0.1612 | 15.392 |
| 0.9547 | −0.1556 | 15.096 | 0.9549 | −0.1588 | 15.2396 | 0.9554 | −0.1623 | 15.392 |
| 0.8199 | −0.1537 | 15.096 | 0.8205 | −0.1571 | 15.2396 | 0.8215 | −0.1607 | 15.392 |
| 0.6851 | −0.1492 | 15.096 | 0.6861 | −0.1528 | 15.2396 | 0.6875 | −0.1566 | 15.392 |
| 0.5502 | −0.1422 | 15.096 | 0.5516 | −0.146 | 15.2396 | 0.5534 | −0.15 | 15.392 |
| 0.4153 | −0.1328 | 15.096 | 0.417 | −0.1367 | 15.2396 | 0.4192 | −0.141 | 15.392 |
| 0.2804 | −0.1209 | 15.096 | 0.2826 | −0.125 | 15.2396 | 0.2851 | −0.1295 | 15.392 |
| 0.1459 | −0.1068 | 15.096 | 0.1484 | −0.111 | 15.2396 | 0.1514 | −0.1157 | 15.392 |
| 0.0118 | −0.0904 | 15.096 | 0.0147 | −0.0949 | 15.2396 | 0.018 | −0.0997 | 15.392 |
| −0.122 | −0.0719 | 15.096 | −0.1188 | −0.0764 | 15.2396 | −0.115 | −0.0814 | 15.392 |
| −0.2554 | −0.0511 | 15.096 | −0.2518 | −0.0558 | 15.2396 | −0.2477 | −0.0609 | 15.392 |
| −0.3885 | −0.0281 | 15.096 | −0.3845 | −0.0329 | 15.2396 | −0.38 | −0.0381 | 15.392 |
| −0.5212 | −0.0028 | 15.096 | −0.5168 | −0.0077 | 15.2396 | −0.5119 | −0.0131 | 15.392 |
| −0.6536 | 0.0249 | 15.096 | −0.6488 | 0.0199 | 15.2396 | −0.6434 | 0.0143 | 15.392 |
| −0.7811 | 0.0538 | 15.096 | −0.776 | 0.0487 | 15.2396 | −0.7702 | 0.0431 | 15.392 |
| −0.9039 | 0.0839 | 15.096 | −0.8984 | 0.0787 | 15.2396 | −0.8923 | 0.073 | 15.392 |
| −1.0218 | 0.1147 | 15.096 | −1.016 | 0.1095 | 15.2396 | −1.0095 | 0.1037 | 15.392 |
| −1.1348 | 0.146 | 15.096 | −1.1287 | 0.1407 | 15.2396 | −1.1218 | 0.1349 | 15.392 |
| −1.243 | 0.1779 | 15.096 | −1.2365 | 0.1726 | 15.2396 | −1.2293 | 0.1667 | 15.392 |
| −1.3465 | 0.21 | 15.096 | −1.3397 | 0.2047 | 15.2396 | −1.3321 | 0.1988 | 15.392 |
| −1.4453 | 0.2417 | 15.096 | −1.4382 | 0.2364 | 15.2396 | −1.4304 | 0.2305 | 15.392 |
| −1.5352 | 0.2721 | 15.096 | −1.5277 | 0.2668 | 15.2396 | −1.5196 | 0.2608 | 15.392 |
| −1.6162 | 0.3002 | 15.096 | −1.6085 | 0.295 | 15.2396 | −1.6 | 0.2891 | 15.392 |
| −1.6887 | 0.3255 | 15.096 | −1.6807 | 0.3204 | 15.2396 | −1.6719 | 0.3145 | 15.392 |
| −1.7526 | 0.3478 | 15.096 | −1.7444 | 0.3427 | 15.2396 | −1.7354 | 0.3369 | 15.392 |
| −1.808 | 0.367 | 15.096 | −1.7996 | 0.3621 | 15.2396 | −1.7904 | 0.3563 | 15.392 |
| −1.8549 | 0.3834 | 15.096 | −1.8463 | 0.3785 | 15.2396 | −1.837 | 0.3728 | 15.392 |
| −1.8949 | 0.3975 | 15.096 | −1.8862 | 0.3927 | 15.2396 | −1.8767 | 0.387 | 15.392 |
| −1.9285 | 0.4096 | 15.096 | −1.9196 | 0.4048 | 15.2396 | −1.91 | 0.3991 | 15.392 |
| −1.9561 | 0.4197 | 15.096 | −1.9471 | 0.4149 | 15.2396 | −1.9373 | 0.4093 | 15.392 |
| −1.9781 | 0.4277 | 15.096 | −1.969 | 0.4231 | 15.2396 | −1.9592 | 0.4175 | 15.392 |
| −1.9953 | 0.4332 | 15.096 | −1.9862 | 0.4286 | 15.2396 | −1.9762 | 0.4232 | 15.392 |
| −2.0086 | 0.4359 | 15.096 | −1.9993 | 0.4315 | 15.2396 | −1.9893 | 0.4262 | 15.392 |
| −2.0198 | 0.4366 | 15.096 | −2.0105 | 0.4323 | 15.2396 | −2.0005 | 0.4271 | 15.392 |
| −2.0286 | 0.4349 | 15.096 | −2.0194 | 0.4307 | 15.2396 | −2.0093 | 0.4257 | 15.392 |

At this point it should be understood that the points disclosed in Table 1 are exemplary, variations/deviations from the points in Table 1 at one or more sections that do not substantially affect the desired properties obtained by the airfoil core shape of the exemplary embodiments fall within the scope of the exemplary embodiments of the invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbomachine component comprising:
a compressor stator vane having an airfoil core shape, the airfoil core shape having a nominal profile substantially in accordance with Cartesian coordinate values of X, Y, and Z set forth in TABLE 1, and wherein X and Y are distances in inches which, when connected by smooth continuing arcs, define airfoil profile sections at each distance Z in inches, the profile sections at the Z distances being joined smoothly with one another to form a complete airfoil core shape.

2. The turbomachine component according to claim 1, wherein the compressor stator vane comprises an airfoil.

3. The turbomachine component according to claim 1, wherein compressor stator vane comprises a first stage compressor stator vane.

4. The turbomachine component according to claim 1, wherein the nominal profile lies within an envelope within +0.160 inches and −0.0 inches in a direction normal to any of the airfoil profile sections.

5. A turbomachine comprising:
a compressor portion; and
a compressor vane provided in the compressor portion, the compressor vane having an airfoil core shape, the airfoil core shape having a nominal profile substantially in accordance with Cartesian coordinate values of X, Y, and Z set forth in TABLE 1, and wherein X and Y are distances in inches which, when connected by smooth continuing arcs, define airfoil profile sections at each distance Z in inches, the profile sections at the Z distances being joined smoothly with one another to form a complete airfoil core shape.

6. The turbomachine according to claim 5, wherein the compressor vane comprises a compressor stator vane.

7. The turbomachine according to claim 6, wherein the compressor stator vane is a first stage compressor stator vane.

8. The turbomachine according to claim 5, wherein the nominal profile lies within an envelope within +0.160 inches and −0.0 inches in a direction normal to any of the airfoil profile sections.

* * * * *